United States Patent [19]
Hasegawa et al.

[11] Patent Number: 5,122,644
[45] Date of Patent: Jun. 16, 1992

[54] OPTICAL CODE READING DEVICE WITH AUTOFOCUSSING

[75] Inventors: Kazuo Hasegawa; Junichi Ouchi, both of Furukawa; Ikuo Ouchi, Miyagi, all of Japan

[73] Assignee: Alps Electric Co., Ltd., Tokyo, Japan

[21] Appl. No.: 731,295

[22] Filed: Jul. 16, 1991

Related U.S. Application Data

[63] Continuation of Ser. No. 417,172, Oct. 4, 1989, abandoned.

[30] Foreign Application Priority Data

| Nov. 17, 1988 | [JP] | Japan | 63-288954 |
| May 22, 1989 | [JP] | Japan | 1-126801 |
| May 22, 1989 | [JP] | Japan | 1-126802 |
| Jun. 2, 1989 | [JP] | Japan | 1-139156 |

[51] Int. Cl.$^5$ ............................................. G06F 7/10
[52] U.S. Cl. ............................ 235/462; 235/467; 235/410; 235/472
[58] Field of Search .......... 235/462, 467, 470, 472, 235/455; 307/258, 302, 560; 372/38

[56] References Cited

U.S. PATENT DOCUMENTS

| 3,925,639 | 12/1975 | Hester | 235/472 |
| 4,169,232 | 9/1979 | Henrich | 307/358 |
| 4,575,625 | 3/1986 | Knowles | 235/472 |
| 4,593,186 | 6/1986 | Swartz et al. | |
| 4,594,717 | 6/1986 | Bracut et al. | 372/38 |
| 4,734,566 | 3/1988 | Senda et al. | 235/455 |
| 4,831,275 | 5/1989 | Drucker | 235/472 |
| 4,843,222 | 6/1989 | Hochcraf | 235/462 |
| 4,877,949 | 10/1989 | Danielson | 235/462 |
| 4,939,355 | 7/1990 | Rando et al. | 235/462 |

OTHER PUBLICATIONS

Tech. Notes, RCH, Princeton N.J., "Automatic Cal. Krc", Tn No. 1361, Jan. 16, 1985, 2 pages.

Primary Examiner—Harold Pitts
Attorney, Agent, or Firm—Guy W. Shoup; Norman R. Klivans

[57] ABSTRACT

In a code reading device, which receives reflected light obtained by scanning a code represented on a recording medium with a laser light beam and decodes it to obtain the code, the reading probability is improved by varying the focusing position for every scanning period with the laser light beam.

3 Claims, 16 Drawing Sheets

OPTICAL CODE READING DEVICE WITH AUTOFOCUSSING

This application is a continuation of application Ser. No. 07/417,172, filed Oct. 4, 1989 now abandoned.

FIELD OF THE INVENTION

The present invention relates to a code reading device which scans codes recorded on a recording medium to output decoded signals, and in particular to a code reading device which can read out even if positional variations take place with respect to the recording medium.

Further the present invention relates to a code reading device in which the reading operation is stabilized by preventing the destruction of a light emitting element constituting a light source for reading out the codes.

Still further the present invention relates to a comparing and a holding circuit, which can effect surely the holding operation on the basis of the detection of the protecting function.

Still further the present invention relates to a code reading device which scans and detects codes recorded in two-valued levels on the recording medium to improve the probability to read out rectangular signals alternating between the "H" and the "L" level, and which has a wide range for reading out.

BACKGROUND OF THE INVENTION

For goods, account books, cards, etc., which are present code recording mediums, information expressed by two magnetical or optical states is coded and recorded by combinations thereof. Representatives of these recorded codes and magnetic cards, and bar code labels, etc. can be cited. All of these codes are so constructed that various sorts of information are expressed by combining the two recorded states and decoded. For example, the bar code optically displayed on the surface of the medium of bar code labels, account books, etc. is expressed by the difference between two reflection coefficients of the ground color in the display region and the printed bar in the same region. A plurality of widths of the bars and the spaces in the bar code, which have a different reflection coefficient, express various sorts of coded information by their combinations.

The bar code expressed optically is relatively simple with respect to account books or labels and is used frequently with a bar code printer for labels and account books, to print bar codes thereon at a place close to a job site. On the other hand, for a code reading device for reading out bar codes, for which the job sites of the reading operation are scattered, a portable hand wand type scanner disclosed e.g. in JP-B-63-60,435 (JP-A-56-140,467; corresponding U.S. Pat. Nos. 4,387,297, 4,496,831 and 4,593,186) is convenient.

For detection of this kind of scanners there are the CCD light receiving type, the laser scanner type, etc., in which the medium is excited by irradiation light and having a detection position to where light reflected by the medium is forwarded. The reading characteristics of this kind of code reading devices are influenced by 3 factors including the state of the light emitting and the light receiving element in the code reading device, the state of operation from the light emitting and the light receiving element to the medium, and the state of representation on the medium. The hand wand type bar code scanner of the laser scanning type is popular because it can read out the bar code without contact and a bar code representation having a large width can be read out.

In a bar code scanner using the method, by which the bar code is scanned with a laser beam to be read out. There is a mechanism called an autofocus, by which the focusing position of the optical system is variable, to improve operability by increasing the readable region. In this way a wider region is readable than with a fixed focus.

A prior art technique using a laser scanner having such an autofocus mechanism will be explained below, referring to FIGS. 14 to 16.

FIG. 14 is a perspective view illustrating the state where the bar code is read out by the laser scanner; FIG. 15 is a scheme showing the arrangement of various parts for explaining the reading resolving power of the laser scanner; and FIGS. 16(a) to 16(d) are schemes illustrating the reading operation of the laser scanner.

In the figures reference numeral 801 is a laser scanner; 802 is a bar code representation; 8011 is a scanner case; 8012 is a semiconductor laser; and 8013 is an optical system.

As indicated in FIG. 14, the reading operation is effected by locating the laser scanner 801 so as to be opposite to the bar code representation 802. In the case where the optical system in the laser scanner 801 has a fixed focus, the laser scanner 802 and the bar code representation 802 should be located, opposite to each other so that the distance therebetween, i.e. the read distance D, is so set that the bar code representation 802 is located within the focus depth, i.e. the read distance.

Such a laser scanner 801 is provided, as indicated in FIG. 15, with the semiconductor laser 8012 disposed in the scanner case 8011 thereof and the optical system (objective lens) 8013 for focusing the laser beam emitted by this semiconductor laser 8012.

The laser beam emitted by this semiconductor laser 8012 is focused by the optical system 8013 at a focusing point 8013. The neighborhood of this focusing point F is a high resolution range, where fine codes can be read out, and with increasing distance from the focusing point F only codes of increasing size can be read out, from a middle resolution range to a low resolution range.

With respect to this focusing point, the diameter of the laser beam is smallest at the focusing point and increases with increasing distance therefrom.

As indicated in FIG. 16(a), the bar code recorded in the bar code representation 802, where the spot of the laser beam is formed, is expressed in a code by combining bars (black) and spaces (white). In the structure indicated in the figure the bar code is expressed in two-valued levels of narrow bar/wide bar and wide bar/wide space. As indicated in the figure, a void B, a deficiency C or dirt may exist, depending on the printing and the state of the surface of the medium. In the case where a bar code having such problems is scanned with the laser beam at a scan position CS indicated in the figure, a light reception signal obtained from the light receiving element is somewhat distorted, as indicated in FIG. 16(b), when the spot has a middle size, and when the size of the spot is smallest, the waveform varies due to the void B and the deficiency C, as indicated in FIG. 16(c). Further, when the size of the spot is great, the waveform varies, as indicated in FIG. 16(d), depending on the focused spot size, where it is extremely distorted so that the binary processing is difficult. In the case of this bar code representation correct decoding is possible in the state where the spot has a middle size, as indicated in FIG. 16(b). In the case where the size of the spot is smallest, as indicated in FIG. 16(c), the levels of the waveform corresponding to the positions of the void B and the deficiency C are lowered and shifts A and B are produced, which prevents correctly the bar code. Further, in the case where the spot has a great size, as indicated in FIG. 16(d), the ability to follow the bar code pattern and the output waveform is impacted on the whole so as to be dull, which makes the decoding operation extremely difficult.

A scanner provided with an autofocus mechanism, which measures the distance between the medium and the scanner and adjusts the focusing point so as to be on the surface of the bar code representation, moves the optical system 8013 on the basis of the measured distance and adjusts automatically the focus.

A light reception signal obtained by the scanner is binary processed. The decoding processing is effected, as described in detail in Japanese in "Formation of Bar Code System", separate volume of Transistor Technique, Sensor Interfacing, No. 4, published by CQ Publishing Company, Jul. 1, 1984, pp. 197 to 199.

FIG. 17 is a circuit diagram showing the construction of the principal part of a semiconductor laser driving circuit of the coding device according to the prior art technique, in which De is a laser diode; 72 is an NPN type transistor driving the laser diode; 73 is a current limiting resistance; 74 is controller; 75 is an NPN type transistor used for the operation of protecting the laser diode De; and 76 is an initiation detection section.

In FIG. 17, the transistor 72 and the resistance 73, which control the driving current necessary for obtaining a predetermined light intensity from the diode De are connected in series with the laser diode De, and the output of the controller 74 for controlling this driving current is supplied to the base of the transistor 72 serving as the control terminal thereof.

The intensity of the light emitted by the laser diode De is controlled by the intensity of the driving current corresponding to the value of the impedance between the collector and the emitter of the transistor 72, depending on the output value of the controller 74, to which an emitted light intensity setting signal is supplied from the exterior.

However, with construction described above, the laser diode De can be destroyed by surge current produced at the switching-on of the power source. As a measure to prevent this the collector-emitter circuit of the transistor 75 for protecting is inserted in series in the series circuit consisting of the laser diode De, the collector-emitter circuit of the transistor 72 and the resistance 73, so that the time the power source is switched-on is detected and the impedance between the collector and the emitter of the transistor 75 is lowered relatively slowly in a predetermined time. In this way the driving current is increased gradually so as to delay the usual lighting operation so that a so-called slow start operation is effected.

In this kind of code reading device, in the case where it is so constructed that the protecting operation for the semiconductor laser driving circuit is effected and the voltage varying, dependent on the environment, is compared with a reference voltage, the result obtained by the comparison being held, the circuit is so constructed that a device having the holding function such as a thyristor, a flipflop, etc. is connected with the output of a comparator effecting the operation of comparing the varying voltage with the reference voltage.

Such a prior art comparator circuit with latch will be explained referring to FIG. 18.

FIG. 18 is a scheme illustrating the construction of such a prior art comparator circuit with latch.

In FIG. 18 reference numeral 51 is a comparator circuit; 52 is a thyristor circuit; 53 is an input terminal; and 54 is a reference voltage power source.

The input voltage Vin to in the input terminal 53, which is the voltage to be compared, is applied to the non-inverting input terminal + of the comparator circuit 51 and compared with the reference voltage Vref of the reference voltage power source 54 applied to the inverting input terminal − of the comparator circuit 54. If the relation;

input voltage Vin > reference voltage Vref is valid, the output voltage Vout from the output terminal of the comparator circuit 51 is changed to the "H" level and the output voltage Vout of "H" level is applied to the gate terminal of the thyristor 52 through the current limiting resistance. In this way the impedance of the anode and the cathode of the thyristor 52 is turned on to a very low state. This state is held, until the voltage applied to the anode and the cathode of the thyristor 52 not shown in the figure is reset so that it is lowered to a value under a predetermined voltage.

Further, in this holding structure, a flipflop circuit is disposed in lieu of the thyristor 52 so that the holding operation is effected according to the output voltage Vout of "H" level and that the holding state is reset by the reset terminal of the flipflop circuit. The protecting operation for the semiconductor laser illuminating the optical recording medium can be carried out by the operation for comparing, holding and resetting.

In this kind of code reading device, because of fluctuations in the distance between the medium and the light receiving element and the angle corresponding to the operation state as well as the ground color and the reflection coefficient of the medium corresponding to the representation state, the detection light intensity arriving at the light receiving element varies significantly, which gives rise to undulations or differences in the height in the signal of amplitude obtained from the light receiving element. In order to obtain a rectangular pulse by amplifying this signal of amplitude for the purpose of the digital processing thereof, it is necessary to widen the dynamic range of the amplifying circuit. Amplifying circuits having a wide dynamic range there are generally known those effecting automatic gain control (AGC) and those effecting logarithmic curve amplification (Log AMP). These are not used in practice for the reason stated in the next paragraph, but since a measurement is taken by using the waveform processing such as a clamping circuit, the number of operations necessary for a success of the reading increases naturally and the recording state of the recording medium is restricted.

However the prior art code reading device explained above, referring to FIGS. 14 to 16(d), has a problem that since it is so constructed that the focusing point is moved automatically on the basis of the distance between the recording medium and the scanner, in many cases the adjusted focusing point is not always in accordance with a readable position because of fluctuations in the state of representation of the code or the state of the surface of the recording medium.

A first object of the present invention is, therefore, to provide a code reading device which can read the code at the adjusted focusing point and effect the reading in spite of fluctuations in the representation and the recording medium so that a high reading probability can be obtained.

However the prior art code reading device explained above, referring to FIG. 17, has a problem that it is impossible to obtain any semiconductor laser driving construction which will work at a low power source voltage, because the transistor 72 for current driving the laser diode De, the transistor 75 for the protection operation and the current limiting resistance 73 are connected in series and therefore a power source voltage, which is higher by an amount twice as high as the voltage across the emitter-collector circuit, is required in the usual operation.

A second object of the present invention is, therefore, to provide a code reading device having a semiconductor laser driving construction so formed that the destruction of the laser diode De is prevented.

However in the prior art code reading device explained above, referring to FIG. 18, an inconvenience is produced, in the case where it is required to increase the integration density and to reduce the size, because devices, which are difficult to mount on an analogue IC or a small scale wiring board, such as thyristors, flipflops, etc. are used apart from the comparator for the purpose of holding the result of comparison by means of the comparator circuit 51. Further the circuit is complicated, because reset means for lowering the voltage between the anode and the cathode is required in the case where a thyristor is used, which is reset by turning-off, and the intensity of the conduction current between the anode and the cathode is so controlled that it is lower in the continuous holding state thereof than in the holding starting state.

A third object of the present invention is, therefore, to provide a comparator circuit with a latch having a high integration density and a small size.

However, in an amplifying circuit effecting the automatic gain control (AGC) described above, distortions are produced because the initial amplitude of the supplied detection signal corresponds to the rise of the represented code digital, which is not suitable for the detection and the processing of digital codes such as the bar code. Further in an amplifying circuit effecting the logarithmic curve amplification (Log AMP) described above, since the amplification characteristic curve is a logarithmic curve, if there are distortions in the supplied detection signal, the code reading device has a property that the reading is impossible in practice, which is basically unsuitable.

A fourth object of the present invention is, therefore, to provide a code reading device in which the number of detecting operations is small and which can measure a wide representation state of the recording medium.

SUMMARY OF THE INVENTION

In order to achieve the first object described above, first technical means according to the present invention comprises a light emitting element for emitting a laser light beam, with which a code represented optically on a recording medium is irradiated; light emission driving means for supplying driving current for the purpose of making the light emitting element stated above emit the laser light beam; focusing point adjusting means for adjusting the focusing point of the laser light beam thus obtained, depending on the driving state of the light emission driving means; focusing point adjustment driving means for outputting a driving signal to move the adjusted position of the focusing point adjusting means stated above; optical deflection means for scanning the surface of the recording means stated above with the laser light beam stated above; deflection driving means for driving the deflection operation of the optical deflection means stated above; a light receiving element for receiving light reflected by the surface of the recording means stated above; decoding means for effecting the decoding operation on the basis of the output of the light receiving element stated above; and focusing point control means for outputting a control signal for moving the focusing point to the focusing point adjustment driving means stated above during a period of one deflection instruction of the optical deflection means stated above.

In order to achieve the second object described above, second technical means according to the present invention comprises a laser diode De for outputting a laser light beam, depending on a current supplied by a power source Vcc; driving means 18 connected in series therewith for controlling current flowing through the laser diode De stated above; control means 300 for supplying a control signal indicating conduction and interruption of the laser diode De to an input terminal B disposed in the driving means 18 stated above; and initiation detection means 100 for detecting that the power source Vcc stated above and outputting a conduction starting signal preventing surge current to the laser diode De in a predetermined period of time to the control means 300.

In order to achieve the third object described above, third technical means according to the present invention comprises an input terminal 53, to which a voltage to be compared Vin is applied; a comparator 51 having a reference input terminal −, to which a reference voltage Vref, with which the value of the voltage applied to the input terminal 53 is compared, is applied; a comparison input terminal +, to which the voltage to be compared from the input terminal 53 stated above disposed in the comparator 51 stated above is applied; an output terminal 56 disposed in the comparator 51 stated above for outputting a comparison output voltage Vout representing the maximum or the minimum, which is a result obtained by comparing the two voltages applied to the comparison input terminal + and the reference input terminal − stated above, respectively; positive feedback means 57, 59 supplying positive feedback current from the output terminal 56 to the comparison input terminal +; voltage dividing means 26, 27, 58 for dividing a voltage to be compared Vin coming from the input terminal 53, which is applied to the comparison input terminal +, with which the positive feedback means 57, 59 stated above is connected; and reset means 8, Sr, 55, 60 connected with the reference input terminal − for removing the state where the positive feedback current is made flow through the positive feedback means 57, 59 and held by the fact that the value of the voltage supplied through the voltage dividing means 26, 27, 58 stated above crosses the reference voltage Vref; wherein at least one of the positive feedback means 12, 57, 59 and the voltage dividing means 26, 27, 58 is provided with rectifying means regulating the direction of current.

In order to achieve the fourth object described above, fourth technical means according to the present invention comprises scan detection means for scanning and detecting periodically medium, in which codes represented by two states are recorded, with a sensor; amplifying means for amplifying the value detected by the scan detection means stated above to a predetermined level; amplification factor setting means for setting variably the amplification factor of the amplifying means stated above; selecting means for selectively specifying the value set by the amplification factor setting means stated above; selective control means, which selects a certain amplification factor in at least a period, during which the scan detection means stated above feeding the selecting means scans, and at the same time outputs a selection instructing signal for varying the amplification factor, responding to the period; waveform transforming means for transforming the output value of an amplification signal of the amplification factor setting means on the basis of the selection instructing signal of the selection control means stated above into a rectangular signal; and decoding means for decoding the rectangular signal coming from the waveform transforming means stated above, responding to the content of the record in the recording medium.

The present invention provided with the first technical means described above works as follows.

That is, a code reading device is provided, which has a wide reading region and an improved reading probability, even if the state of the recording medium fluctuates, because it is moved to the focusing position, where reading out is possible, depending on the representation state of the code and the state of the surface of the recording medium, due to the fact that it is moved to the focusing position for every scanning period, until the signal obtained by receiving light reflected by the code is decoded to obtain normal decoded data.

The present invention provided with the second technical means described above works as follows.

That is, a code reading device is provided, in which destruction of the laser diode De at a low power source voltage is prevented, because an emitted light intensity setting signal is cancelled by supplying a conduction starting signal to the control means 300, which signal increases gradually the intensity of the current from the initiation detection means 100 at switching-on the power source and the laser diode De is driven by driving means 18 according to the conduction starting signal.

The present invention provided with the third technical means described above works as follows.

That is, a code reading device is provided, in which the feedback current supplied from the output terminal 56 to the comparison input terminal + through the positive feedback means 12, 57, 59 according to the result of the inverted output of the comparator holds the output state of the output terminal 56 by giving forcedly a potential difference between the comparison input terminal + and the reference input terminal −, which constitutes a holding condition. At the same time this potential difference is continued to be held within a determined voltage region, owing to the fact that leak current is prevented by rectifying means provided at least in one of the positive feedback means 12, 57, 59 and the dividing means 26, 27, 58. This condition is surely returned to the usual comparison operation by the reset voltage applied to the comparison input terminal − from the reset means 8, Sr, 55, 60. In this way the circuit construction is simplified.

The present invention provided with the fourth technical means described above works as follows.

That is, a code reading device is provided, in which no special skill is required for the detection operation and which can deal with a relatively wide recording state of the medium, because the decoding is effected with an amplification factor, with which decipherable rectangular signal is obtained, among a plurality of scannings, due to the fact that the amplification factor is kept to be constant during one period of the reading scanning and the amplification is effected with an amplification factor varied when the procedure proceeds to the next period, while a plurality of reading scannings are effected by one operation.

BRIEF DESCRIPTION OF THE DRAWINGS

FIG. 1 being a scheme illustrating the outline of the structure of an embodiment of the present invention; FIG. 2 being a scheme showing the construction of an example of the principal part effecting continuous positional adjustment in the device indicated in FIG. 1; FIG. 3 being a scheme showing the construction of another example of the principal part indicated in FIG. 2; FIG. 4 being a scheme showing the construction of an example of the principal part effecting interrupted positional adjustment in the device indicated in FIG. 1; FIG. 5 being a scheme showing the construction of another example of the principal part indicated in FIG. 4; FIG. 6 being a scheme showing the construction of still another example of the principal part indicated in FIG. 4; FIG. 7 being a scheme showing the construction of still another example of the principal part indicated in FIG. 4;

FIG. 8 being a scheme illustrating the construction of an embodiment of the present invention;

FIGS. 9(a) to 9(f) being schemes illustrating comparing circuits with a holding circuit according to the present invention, FIG. 10(a) to 10(b) showing waveforms the working mode of the comparing circuits indicated in FIGS. 9(a) to 9(f);

FIG. 11 being a scheme illustrating the whole construction of a bar code scanner, which is a code reading device according to the present invention; FIG. 12 being a scheme illustrating the principal part of the controlling construction indicated in FIG. 12; FIG. 13 being a circuit diagram showing the construction for processing a light reception signal;

DETAILED DESCRIPTION

Hereinbelow a first embodiment of the present invention having the first technical means will be explained in detail, referring to FIGS. 1 to 7.

Figure 1:
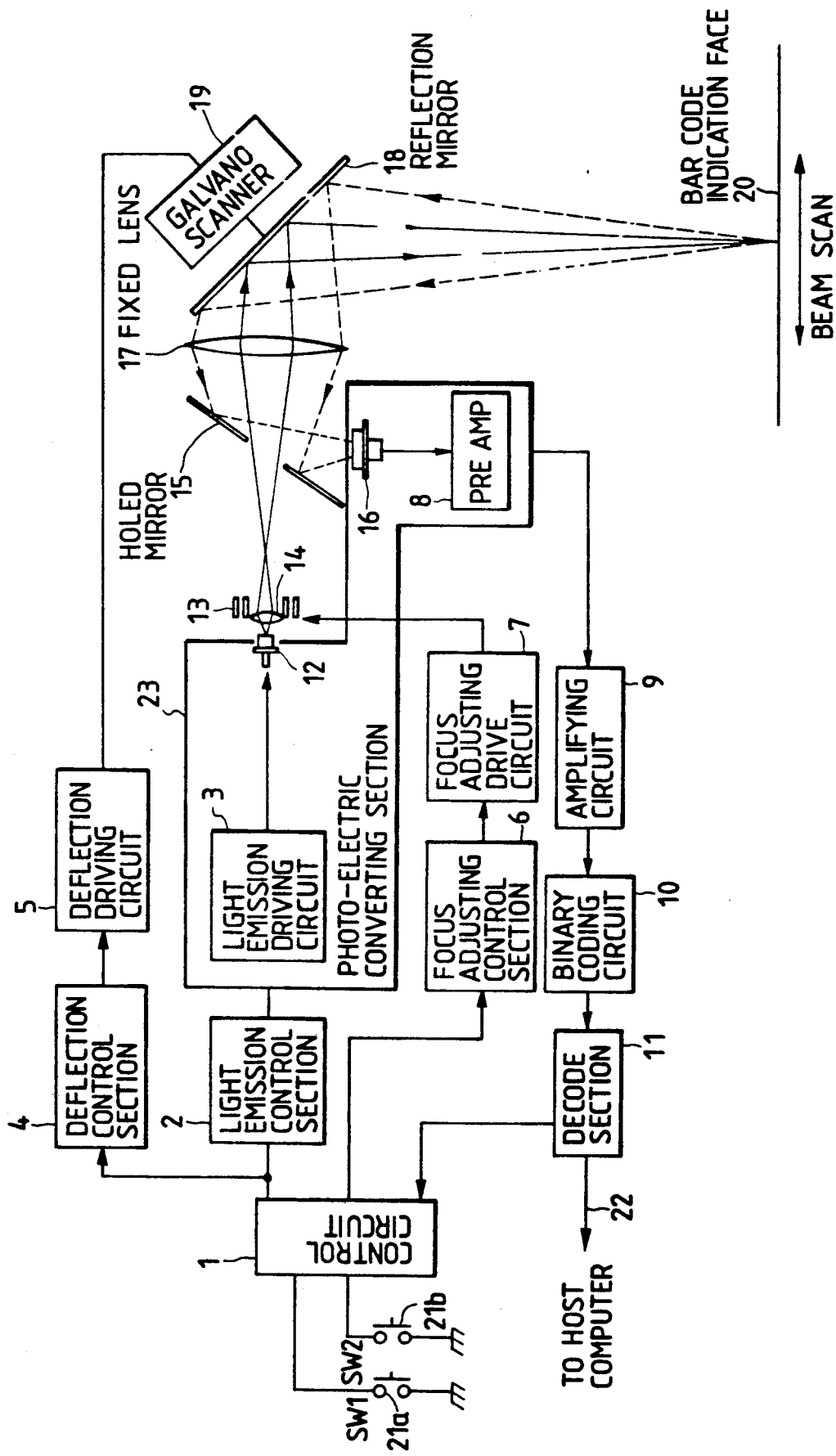
FIGS. 1 to 7 are block diagrams for explaining the code reading device according to the present invention having the first technical means of the present invention.

FIG. 1 is a block diagram showing the outline of the construction for explaining the first embodiment of the present invention, in which reference numeral 1 is a control circuit; 2 is a light emission control section; 3 is a light emission driving circuit; 4 is a deflection control section used in a deflecting device; 5 is a deflection driving circuit; 6 is a focus adjusting control section used in a focus adjusting device (voice coil motor); 7 is a focus adjusting drive circuit; 8 is a preamplifier; 9 is an amplifying circuit; 10 is a binary coding circuit; 11 is a decode section; 12 is a light emitting laser element; 13 is a focus adjusting device constructed e.g. by the voice coil motor; 14 is a focus adjusting lens; 15 is a holed mirror; 16 is a light receiving element; 17 is a fixed lens; 18 is a reflecting mirror; 19 is a galvano scanner; 20 is a bar code representing surface; 21a and 21b are switches Sw 1 and Sw 2, respectively; and 22 is an output terminal to a host computer. Further a photo-electric converting section is composed of the light emission driving circuit 3, the light emitting laser element 12, a light receiving element 16 and a preamplifier 8. Still further the deflecting device is composed of the reflecting mirror 18 and the galvano scanner 19.

In the figure a laser light beam is emitted by the light emitting laser element 12 energized by the light emission driving circuit 3, driven by the light emission control section 2. The laser light beam passes through the hole formed in the holed mirror 15 and collected by the fixed lens 17. Then the path thereof is deflected by the reflecting mirror 17 and it arrives at the bar code representing surface 20.

The reflecting mirror 18 sweeps the laser light beam in a one-dimensional direction by the deflection scanning by means of the galvano scanner 19. The bar code is scanned therewith and the reflected light is projected to the light receiving element 16 through the reflecting mirror 18 and the fixed lens 17.

The galvano scanner 19 is driven by a driving signal from the deflection driving circuit 5 on the basis of a signal from the deflection control section 4.

The reflected light from the bar code, which is received by the light receiving element 16, is converted by the photo-electric converting section 23 into an electric signal, which is outputted to the amplifying circuit 9 through the preamplifier 8. This signal is given to the binary coding circuit 10, after having been amplified to a predetermined level in this amplifying circuit.

The binary coding circuit 10 transforms the input signal into a two-valued signal, which is supplied to the decode section 11. A signal thus obtained by decoding (decode data) is transmitted to the host computer (not shown in the figure) through the terminal 22.

In this case, since the distance between the light emitting laser element 12 and the bar code representing surface 20 is not fixed, in the case where the optical system of the scanner has a fixed focus, the focusing point should be adjusted by moving the scanner or the bar code medium.

The device indicated in the figure is so constructed that this focus adjustment is effected automatically. That is, the focus adjusting device, which is an actuator called a voice coil motor, producing moving force making the focus adjusting lens 14 move forward and backward, is mounted. In this way the focus adjusting lens 14 is moved forward and backward in the axial direction of the optical system. depending on the distance between the light emitting laser element 12 and the bar code representing surface 20.

The movement of this focus adjusting lens 14 is effected by the fact that the focus adjusting drive section 7 gives the focus adjusting device 13 driving current, receiving the driving signal produced by the focus adjusting control section 6 based on the control signal of the control circuit 1.

Further the deflecting device sweeps the laser light beam in a one-dimensional direction in the direction, in which the galvano scanner 19 scans the bar code on the bar code representing surface 20 by means of the reflecting mirror 18 and it is driven by the deflection driving circuit 5 inputting the driving signal of the deflection control section 4.

The switches Sw 1 and Sw 2 are a two-step switch operated by a user. A first step operation switches-on the switch Sw 1 (21a) and supplies a driving signal to the light emission driving circuit 2, which makes the light emitting laser element 12 emit the laser light beam and at the same time drives the deflection control section 4 and the deflection driving circuit 5 so as to scan the bar code representing surface with the laser light beam.

Then a second step operation switches-on the switch Sw 2 (21b) and moves the focus adjusting lens 14 by means of the focus adjusting device 13 through the focus adjusting control section 6 and the focus adjusting drive section 7 so as to effect the focus adjustment.

The focus adjusting control section 6 generates successively stepwise continuous driving signals or stepwise driving signals, e.g. driving signals of 10 steps. The focus adjusting drive section 7 drives the focus adjusting device 13 by using these driving signals so as to move continuously or stepwise the focus adjusting lens 14 forward and backward along the optical axis.

In the course of the movement of the focus adjusting lens 14, the bar code indicated on the bar code representing surface 20 is irradiated with the laser light beam and the reflected light is collected on the light receiving element 16 through the reflecting mirror 18, the fixed lens 17 and the holed mirror 15 to be converted there into an analogue signal.

This analogue signal is amplified to a predetermined level by the amplifying circuit 9, after having been preamplified by the preamplifier 8, and inputted to the binary coding circuit 10.

The binary coding circuit 10 converts the amplified analogue signal into a two-valued signal and gives it to the decoding section 11, in which the signal is decoded. In the case where it is correctly decoded there, the decode data are transmitted to the host computer through the terminal 22.

When it is correctly decoded in the decoding section 11, the decoding section 11 gives the control circuit 1 a signal indicating that the decoding has been effected correctly.

When the control circuit 1 receives the signal described above from the decoding section 11, it stops the operations of the light emission driving circuit 3 and the deflection control section through the light emission control section 2 to execute instructions to stop the emission of the laser light beam and to stop the swing of the reflecting mirror 18 by means of the galvano scanner 19.

At the same time the control circuit 1 stops the driving operation of the focus adjusting control section 6 and issues an instruction to stop the focus adjusting operation of the focusing adjusting lens 14 by means of the focus adjusting device 13.

As operation method for the focusing adjustment, there are known a plurality of methods as explained in detail, referring to FIGS. 2 to 7. The parts and the functions, which are identical to those explained, referring to FIG. 1, are indicated by the same or relating reference numerals and detailed explanation thereof will be omitted.

Figure 2:
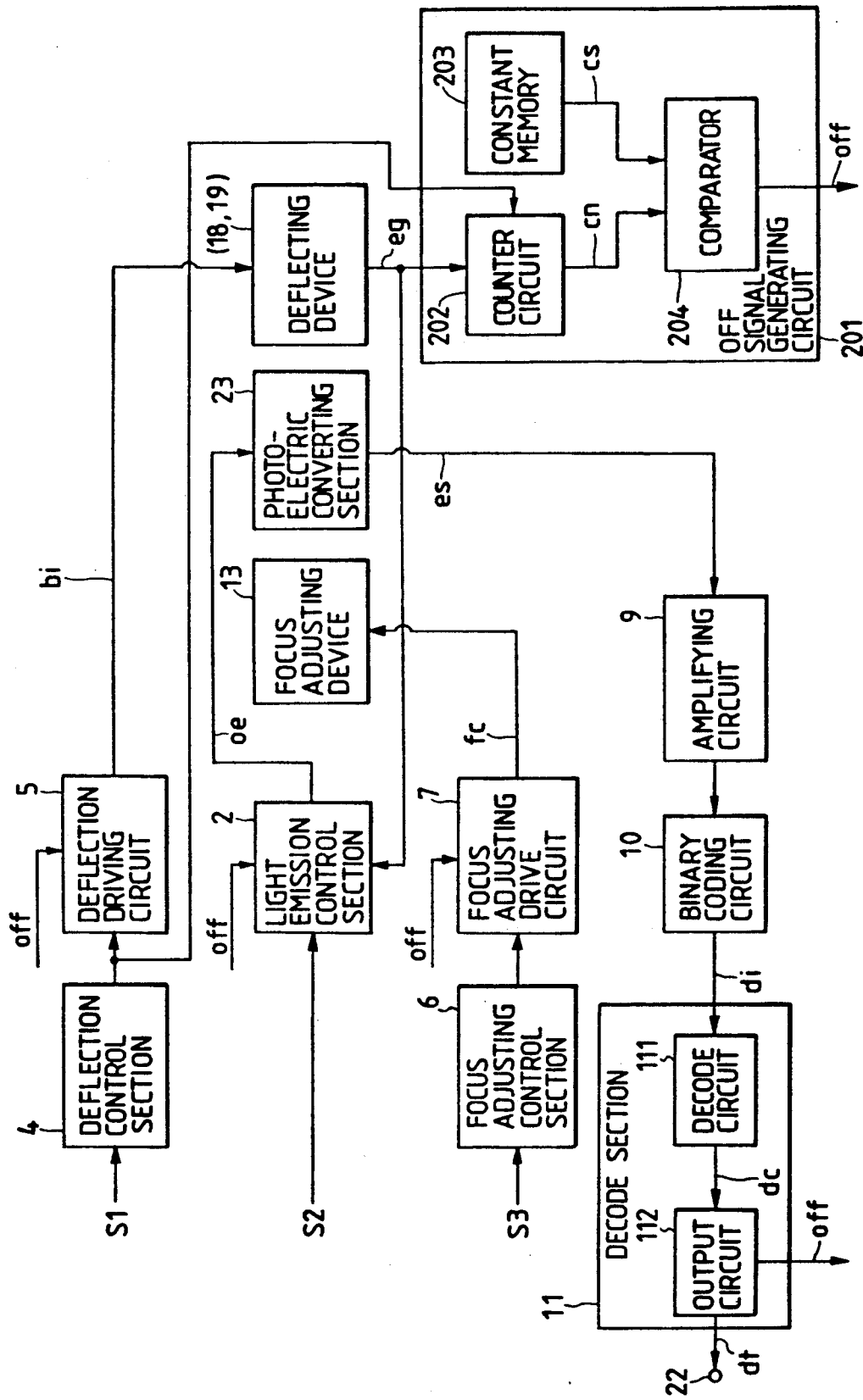

At first, FIG. 2 is a scheme illustrating the construction, which is an example of the laser scanner, in which the focus adjusting lens is moved continuously.

In FIG. 2, reference numeral 111 is a decode circuit; 112 is an output circuit; 201 is an off signal generating circuit; 202 is a counter circuit; 203 is a constant memory; and 204 is a comparator.

The decode section 11 consists of the decode circuit 111 and the output circuit 112, which outputs a decode signal dt on the basis of the decoded signal dc constituted by character data and error data outputted by this circuit 11 and at the same time gives the control circuit 1 a decode termination signal off on the basis of the character data outputted by the circuit 11.

The focus adjusting lens 14 moves non-stepwise and continuously the focus from the nearest position to the farthest position and sets the optimum focusing point, where the probability of the success is greatest, so that it is located at the middle point between the nearest position and the farthest position, in the case where the interval in the arrangement between the laser scanner and the bar code representing surface 20. This movement from the nearest position to the farthest position of the focus is effected with the speed and the number of scannings previously set, corresponding to the greatest number of scannings with the deflecting device 18, 19. The device is so constructed that the movement of the focus adjusting lens 14 is stopped, when the decoding is terminated or when the deflecting device 18, 19 has scanned the bar code the greatest number of times of scannings.

The deflection control section 4, to which a scanning instruction signal s1 from the control circuit 1 to start the scanning resets the count number of a counting circuit 202 to its initial value and at the same time outputs a drive instruction signal for making the deflection drive circuit 5 supply a deflection driving signal bi to make the deflecting device 18, 19 effect an oscillation operation.

During a period of time where the deflection driving signal bi is supplied, the deflecting device 18, 19 scans the bar code representing surface 20 with the laser light beam by means of the reflecting mirror 18. In order to obtain this number of scannings, the number of deflecting movements of a pivoting shaft, not shown in the figure, disposed in the galvano scanner 19 is detected and pulse-shaped pivoting movement detecting signals eg are counted by the counting circuit 202. The count number cn of the counting circuit 202 is compared with a stored value cs in the comparator 204, which corresponds to the greatest number of pivoting movements of the galvano scanner 19, which is previously set and stored in the constant memory 203, for every scan instructing signal s1, and when it is judged that the following formula;

$$cn \geq cs$$

is valid, the off signal generating circuit 201 supplies an operation stop instructing signal off to each of the circuits of the light emission control circuit 2, the deflection driving circuit 5 and the focus adjusting drive circuit 7. Each of the circuits, to which this operation stop instructing signal off is supplied, is constructed so as to interrupt the deflection driving signal bi, the light emission driving signal oe and the focus adjusting drive signal fc. Further this pivoting movement detection signal eg is supplied also to the light emission control section 2.

The light emission control section 2, to which a light emission instructing signal s2 for making it be ready for the laser light beam emitting operation is supplied from the control circuit 1 at the same time as the output of the scan instructing signal s1, which makes the galvano scanner 19 pivot, continues to supply the stop instructing signal to the light emission driving circuit 3 for making it stop the light emitting operation, until the first pulse of the pivoting movement detection signal eg, which the galvano scanner 19 outputs. The light emission control section 2, to which the first pulse of the pivoting movement detection signal eg is supplied, just after the reflecting mirror 18 has begun to start the pivoting movement, outputs the light emission driving signal oe to the light emission driving circuit 3 to energize the light emitting laser element 12 and to excite the laser light beam. This is because in the state where the reflecting mirror 18 is not rotated or in the case where the speed of the rotation thereof is lower than a predetermined value, the linear speed of the movement of the spot of the projected laser light beam is low and it is necessary to effect a protecting operation to prevent accident that a same place on a human body such as an eye is irradiated with the laser light beam during a long period of time.

The light emission control section 2, to which this pivoting movement detection signal eg is supplied, stops the laser light beam emitting operation, in the case where no pulse of the pivoting movement detection signal eg is supplied during a period of time corresponding to a number of times, which is set so as to be e.g. 2 to 8 times as great as the number of times the galvano scanner 19 is to pivot per unit time so that the linear speed of the movement of the spot of the projected laser light beam is lowered and the protecting operation is effected to prevent accident that a same place on a human body such as an eye is irradiated with the laser light beam.

The light emission control section 2, to which the operation stop instructing signal off outputted by the off signal generating circuit 201 is supplied, supposes that no reading of the bar code to be detected has been effected during the period of time corresponding to the greatest number of scannings and stops the laser light beam emitting operation.

Information of the analogue signal coming from the light receiving element 16 in the photo-electric converting section 23 through the preamplifier 8 is transmitted to the amplifier circuit 9 and the binary coding circuit 10 in this order and a two-valued signal di and supplied to the decoding circuit 111.

When the switch Sw 2 (21b) is turned on by the second step operation, after the switch Sw 1 (21a) has been turned on by the first step operation, the focus adjusting control section 6, to which a focus adjust instructing signal s3 is supplied from the control circuit 1, is so constructed that a drive instructing signal for moving the focus adjusting device 13 with predetermined speed and direction is supplied to the focus adjusting drive circuit 7. The focus adjusting drive circuit 7 moves the focus adjusting device 13, on which the focus adjusting lens 14, according to a supplied focus adjusting drive signal fc and stops the moving operation of the focus adjusting device 13 in synchronism with the supply of the movement stop instructing signal off, even in the state where the focus adjusting drive signal fc. The focus adjusting device 13 moves slowly and continuously with a speed within a tolerated speed region, with which it moves once forward and backward during a period of time corresponding to the greatest number of times of pivoting movements of the galvano scanner 19. This movement direction is so set that the forward and backward movement is effected around the optimum focusing point described above, using it as the reference position. In the case where the movement stop instructing signal off is supplied, the focus adjusting device 13 is stopped in the neighborhood of the optimum focusing point. However, even in the state where the focus adjustment instructing signal s3 is interrupted by a decoding termination signal off of the output circuit 112 and it is stopped at a not specified position, it is moved in a predetermined direction previously set, after it has been returned to the optimum focusing point by inputting again the focus adjustment instructing signal s3.

Further it is a matter of course that the scanning instructing signal s1, the light emission instructing signal s2 and the focusing adjustment instructing signal s3 described above outputted by the control circuit 1 may be replaced by one corresponding to the scanning instructing signal s1 and the light emission instructing signal s2 and another corresponding to the focusing adjustment instructing signal s3. However it may be so constructed that the three signals are unified to one and only one operation switch is used to adjust the focusing point.

Hereinbelow, referring to FIG. 3, another example of the laser scanner, which is so constructed that the focusing point is adjusted continuously, as explained, referring to FIG. 2. The parts and the functions indentical to those explained, referring to FIGS. 1 and 2, are indicated by the same or relating reference numerals and therefore explanation thereof will be omitted.

The pivoting movement detection signal eg, which is outputted in the form of a pulse for every deflection of the deflecting device (18, 19), is supplied to the decoding circuit 111. This decoding circuit 111, to which this pivoting movement detection signal eg is supplied, resets the preceding decoding operations and begins to decode the two-valued signal di succeedingly supplied.

Figure 3:
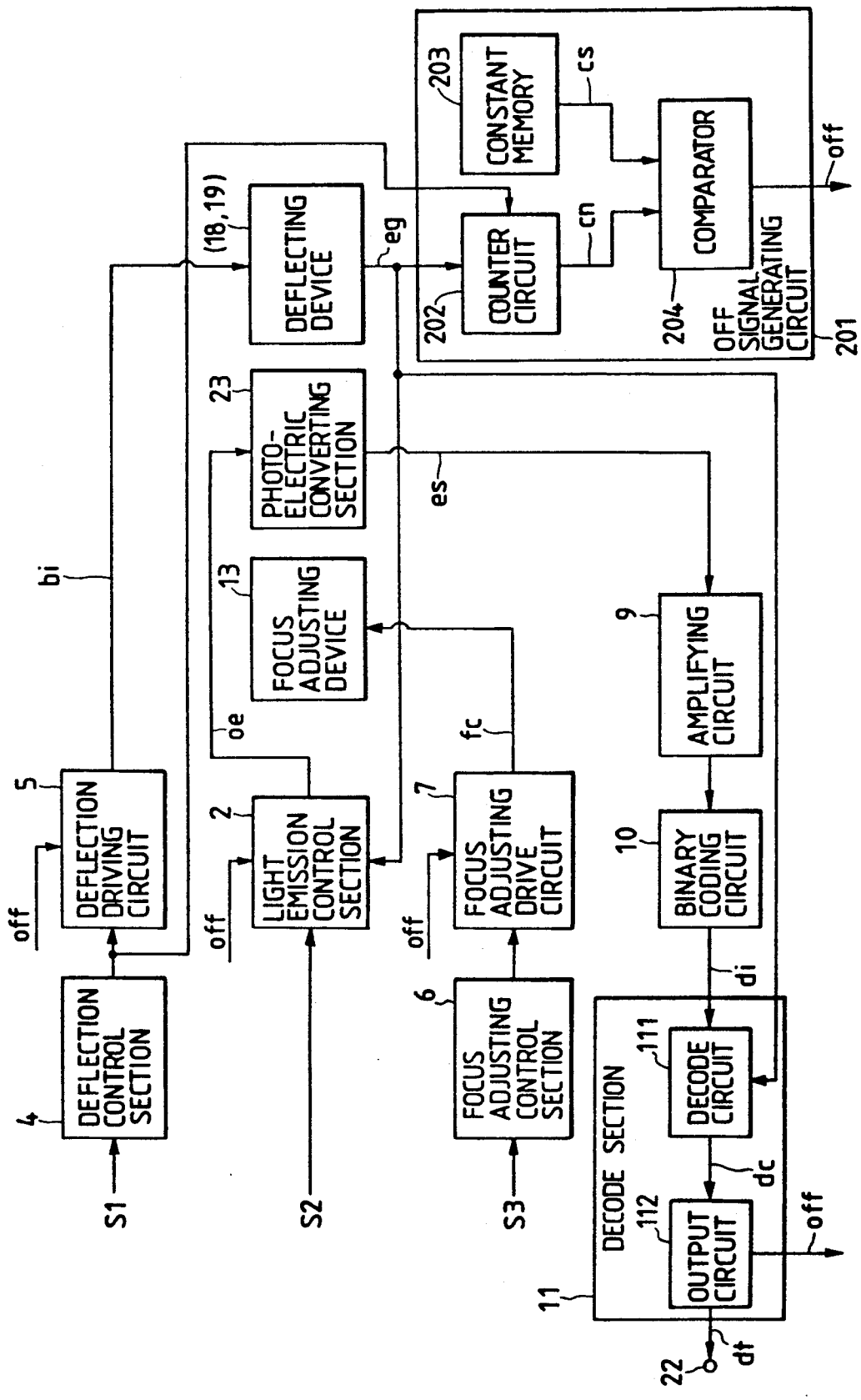

Further, instead of disposing the off signal generating circuit 201 indicated in FIGS. 2 and 3 described above, the device may be so constructed that a signal off for setting the number of scanning detections from an external device (e.g. host computer, etc.) is supplied to each of the circuits.

Hereinbelow an example of the laser scanner, which is so constructed that the focusing point is adjusted step by step according to the number of scannings of the deflecting device will be explained by using the construction scheme indicated in FIG. 4. The parts and the functions identical to those explained, referring to FIGS. 1 to 3, are indicated by the same or relating reference numerals and therefore explanation thereof will be omitted.

Figure 4:
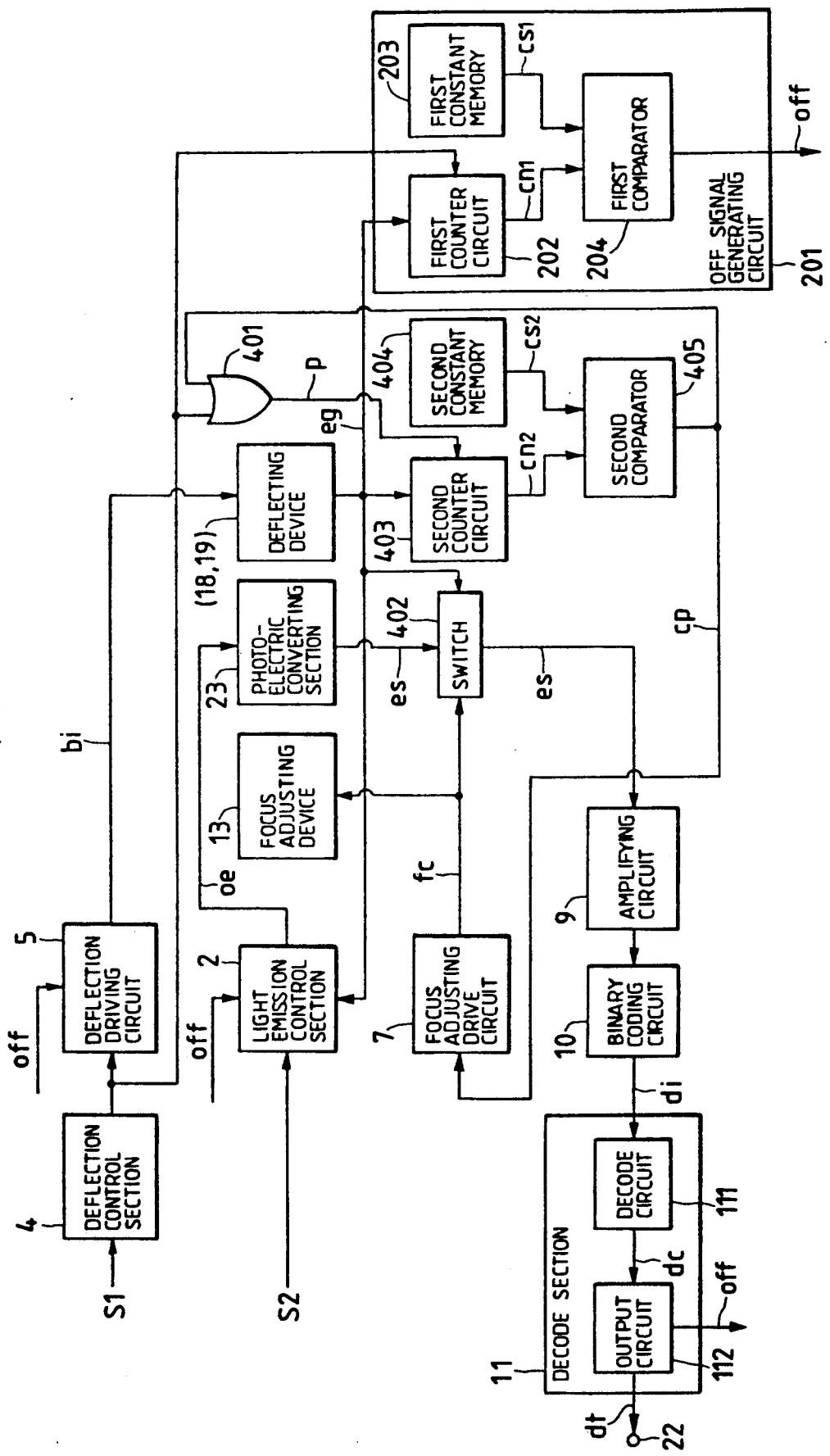

FIG. 4, reference numeral 202 is a first counting circuit; 203 is a first constant memory; 204 is a first comparator; 401 is an OR circuit; 402 is a commutator; 403 is a second counting circuit; and 404 is a second constant memory.

The off signal generating circuit 201, to which the pivoting movement detection signal eg outputted in the form of a pulse, accompanying the pivoting movement of the galvano scanner 19 serving as the deflecting device, is supplied, compares the count number cn1 of the first counter 202 with the value cs1 stored in the first constant memory 203, corresponding to the greatest number of pivoting movements of the scanner 19 for every scanning instructing signal s1 in the first comparator 204 and in the case where it is judged that the condition expressed by the following formula;

$$cn1 \geq cs1$$

is fulfilled, it supplies the movement stop instructing signal off to the light emission control section 2 and the deflection driving circuit 5.

The second counter circuit 403, to which the pivoting movement detection signal eg of the deflecting device 18, 19 is supplied, effects a counting operation similarly to the first counter 202. The second counter circuit 403, to the reset terminal of which the output of the OR circuit 401' is supplied, resets the counting operation by means of a reset signal p in synchronism with either one of a focus change instructing signal cp outputted by the second comparator 405 and a drive instructing signal, which the deflection control section 4 outputs in synchronism with the supply of the scanning instructing signal s1. The second counter circuit 403, to which the pivoting movement detection signal eg is supplied, gives the second comparator 405 the count number cn2. The second comparator 405, to which this count number cn2 as well as the stored value cs1 in the second constant memory 404 set previously by a value m/n obtained by dividing the greatest number of pivoting movement m of the galvano scanner 19, which is the stored value cs1 in the first constant memory 203, by a positive integer n (n=1, 2, 3, . . . , n) excluding 0, supplies a focus change instructing signal cp to the focus adjusting drive circuit 7 and to one of the input terminal of the OR circuit 401, if a condition expressed by the following formula;

$$cn2 \geq cs2$$

is fulfilled.

The focus adjusting drive circuit 7, to which the focus change instructing signal cp is supplied for every number (m/n) of pivoting movements of the galvano scanner 19 supplies the focus adjusting drive signal fc in order that the focus adjusting device 13 moves step by step the focus adjusting lens 14. The focus adjusting device 13 moves the focus adjusting lens 14 for every number (m/n) of pivoting movements (e.g. once for one pivoting movement of the galvano scanner 19) to a new focusing position set stepwise by the focus adjusting drive signal fc.

The focus adjusting drive signal fc varying stepwise is supplied also to the commutator 402. Thus the device is so constructed that the analogue signal es supplied to the amplifying circuit 8 is interrupted only during the period of time previously set corresponding to the termination of the movement of the focus adjusting lens 14 according to the stepwise variation of the focus adjusting drive signal fc.

The pivoting movement detection signal eg is also supplied to this commutator 402. As far as the amount of variations in the linear speed set according to the decoding capacity of the decoding circuit 111, with which the reflecting mirror 14 scans the bar code representing surface 20, is within a tolerated region (i.e. within a predetermined width measured from the center of the pivoting movement), the commutator 402 supplies the analogue signal es to the amplifying circuit 8. When it is outside of the tolerated region (i.e. within predetermined widths measured from the two extremities of the pivoting movement towards the center), it executes a switching operation to interrupt the analogue signal es to the amplifying circuit 8. Consequently the circuits succeeding the amplifying circuit 8 effect a series of decoding operations only under the condition of time where the amount of variations in the linear speed of the scanning is within the tolerated region and the focusing position is stable.

Hereinbelow another example of the laser scanner constructed so as to adjust step by step the focusing position according to the number of scannings of the deflecting device will be explained, referring to the construction scheme indicated in FIG. 5. The parts and the functions identical to those explained, referring to FIGS. 1 to 4, are indicated by the same or relating reference numerals and therefore explanation thereof will be omitted.

Figure 5:
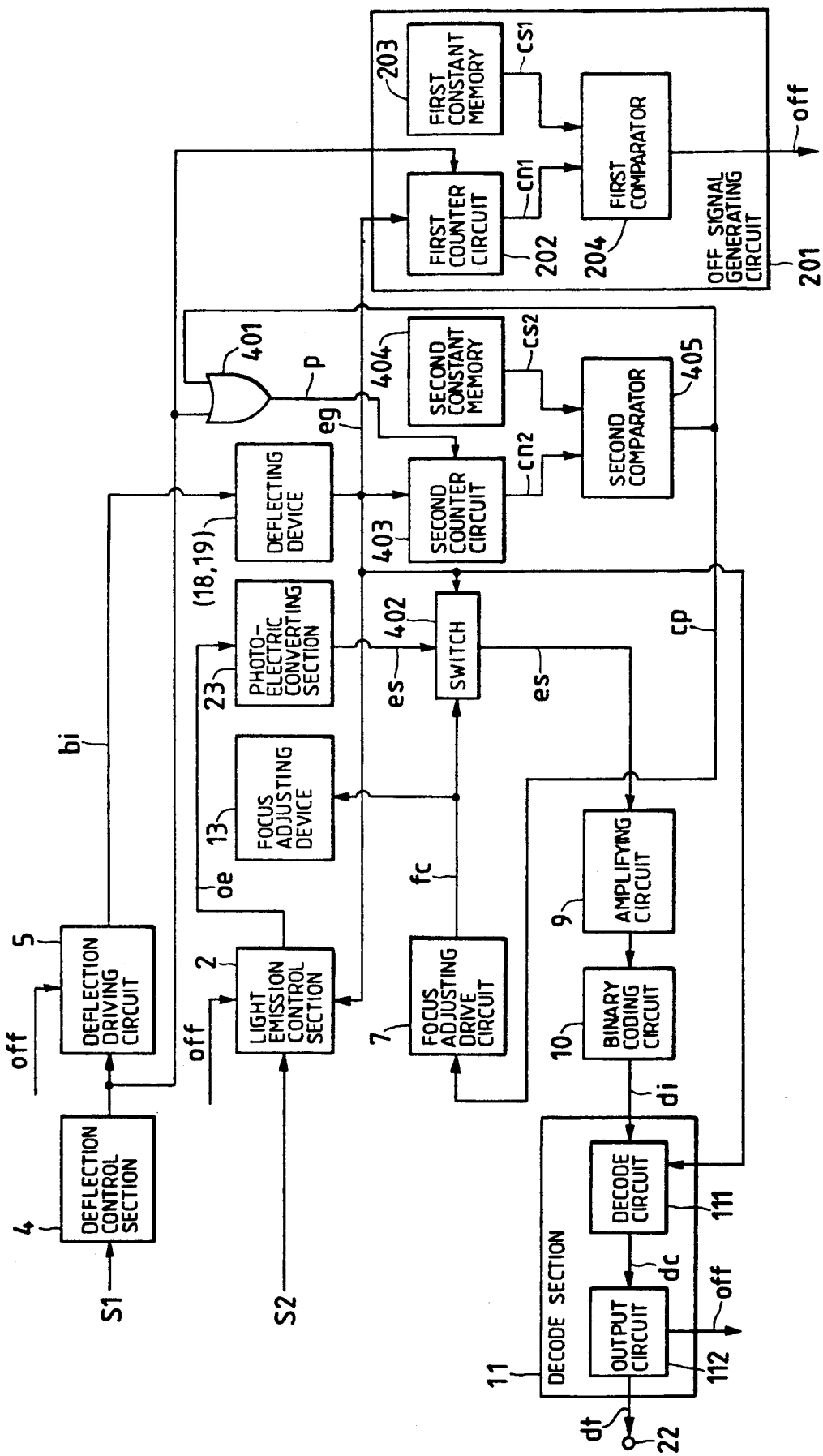

The difference of the device indicated in FIG. 5 differs from that indicated in FIG. 4 is that the pivoting movement detection signal e.g. according to the number of pivoting movements of the galvano scanner 19 of the deflecting device is supplied to the reset terminal of the decoding circuit 111. When the pivoting movement detection signal e.g. is supplied to the decoding circuit 111, all the decoding operations, which are in course of execution, are cancelled and the decoding circuit 111 begins to decode the data obtained by transforming the analogue signal e.g. outputted after the supply of the pivoting movement detection signal e.g. into a two-valued signal. That is, this reset operation is so effected that a set of two-valued signals di, for which the decoding operation is not terminated before the supply of the pivoting movement detection signal e.g., is cleared, supposing that no normal bar code has been read out and that an encoding processing for a pulse train of the two-valued signal di supplied succeedingly is effected for every reading scanning.

Still another example of the laser scanner constructed so as to adjust step by step the focusing position according to the number of scannings of the deflecting device will be explained below, referring to the construction scheme indicated in FIG. 6. The parts and the functions identical to those explained, referring to FIGS. 1 to 5, are indicated by the same or relating reference numerals and therefore explanation thereof will be omitted.

The decoding circuit 111 in the state where the first two-valued signal di is not decoded even after the passage of a period of time set previously corresponding to the scanning speed of the deflecting device 18, 19 cancels automatically all the data, which have been supplied up to this moment, to reset the circuit to its initial state and at the same time supplies a focus change instructing signal fail to the focus adjusting drive circuit 7. Every time a focus change instructing signal fail is supplied, the focus adjusting drive circuit 7 supplies a focus adjust driving signal fc varying stepwise for specifying the amount of displacement previously set and its direction to the focus adjusting device 13 and the commutator 402 to execute the focus change procedure.

Still another example of the laser scanner constructed so as to adjust step by step the focusing position according to the number of scannings of the deflecting device will be explained below, referring to the construction scheme indicated in FIG. 7. The parts and the functions identical to those explained, referring to FIGS. 1 to 6, are indicated by the same or relating reference numerals and therefore explanation thereof will be omitted.

Figure 6:
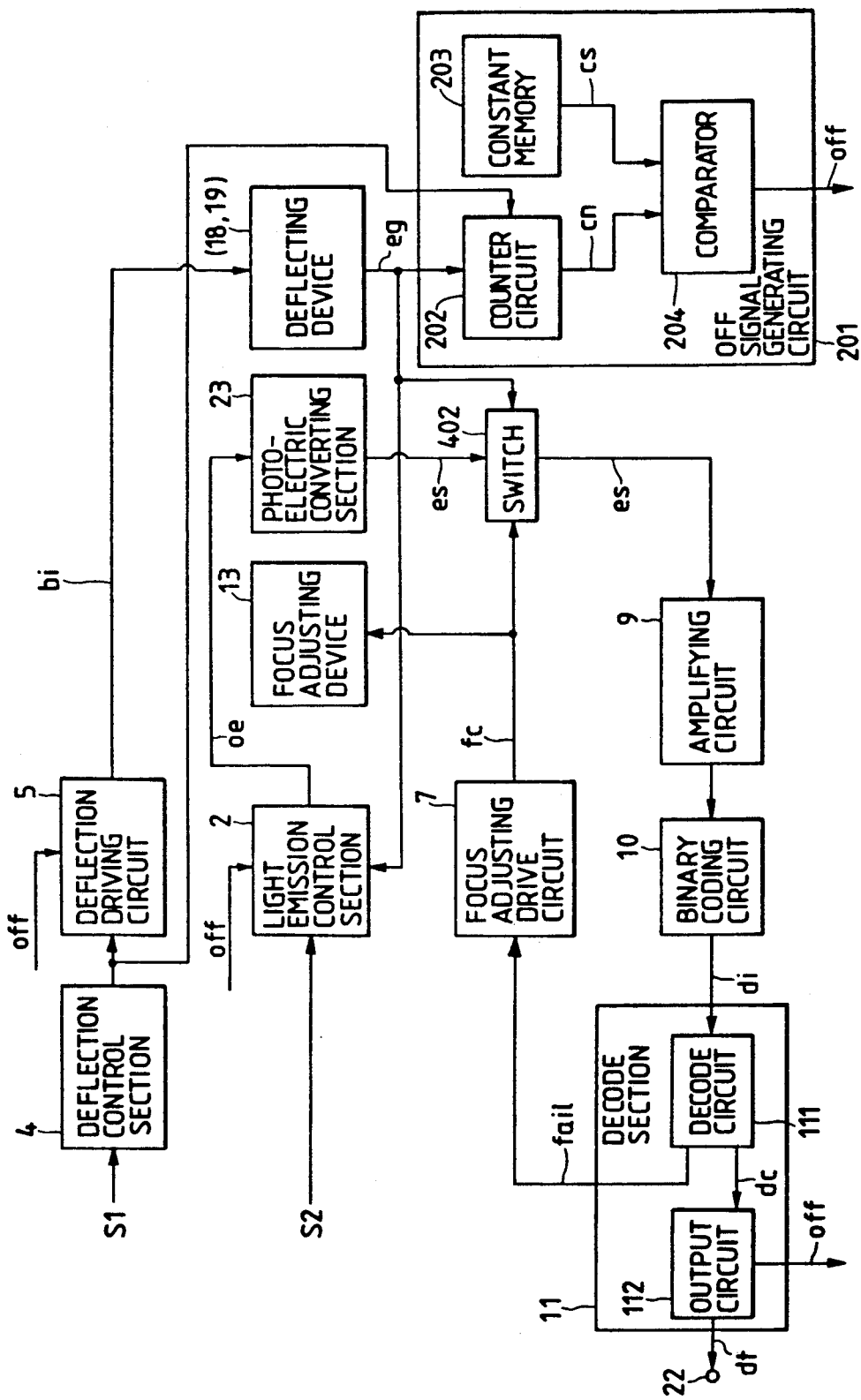

Different from the construction indicated in FIG. 6, the pivoting movement detection signal e.g. is supplied to the reset of the decoding circuit 111 and the device is so constructed that the focus change instructing signal fail is supplied to the focus adjusting derive circuit 7 only in the state where the decoding operation is not terminated and the pivoting movement detection signal e.g. is supplied.

Figure 7:
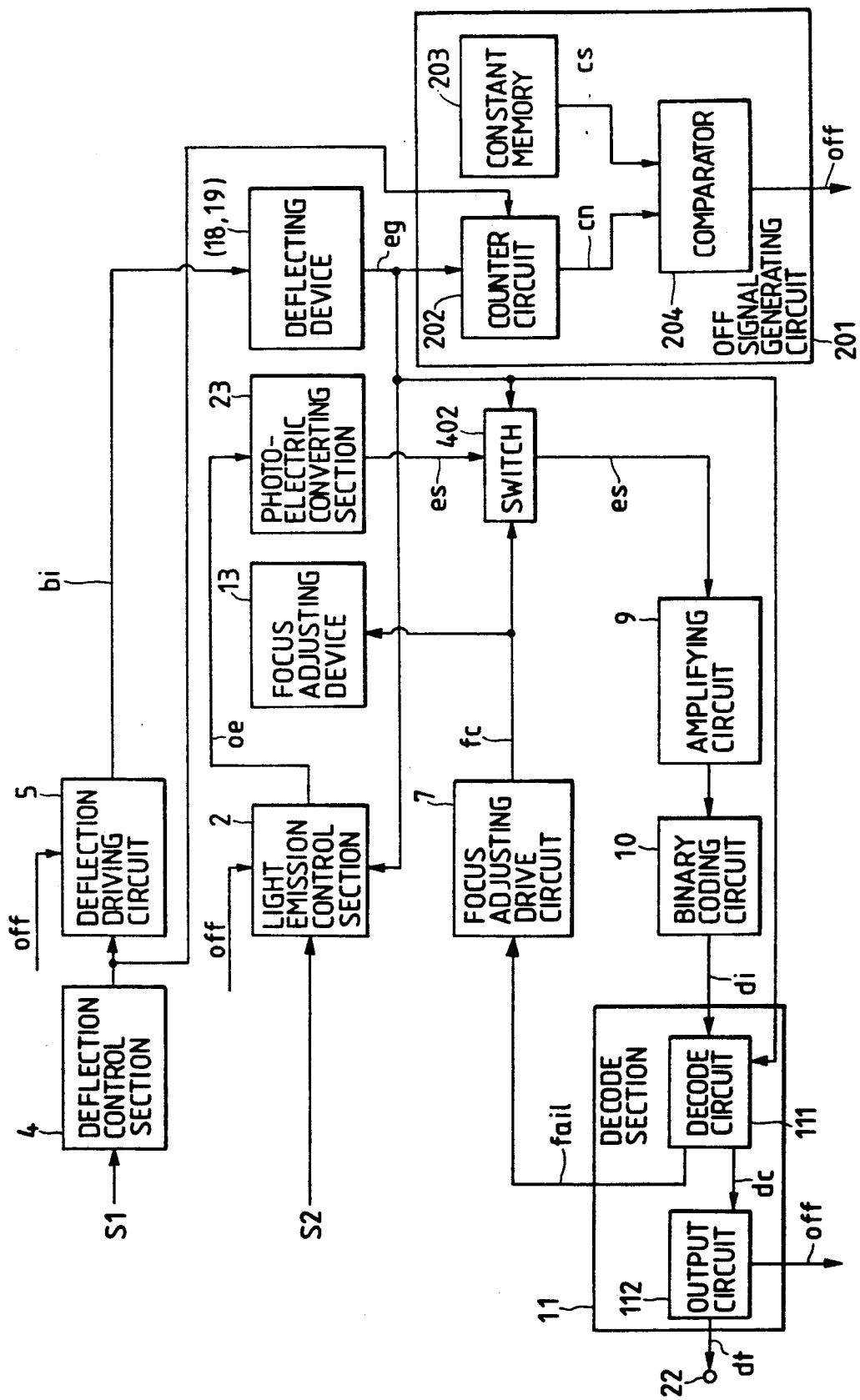

The devices indicated in FIGS. 6 and 7 described above are so constructed that the focusing position is changed, in the state where the decoding operation cannot be terminated and no decoding signal dt can be obtained in a predetermined period of time. On the contrary, in the case where a decoding signal dt is obtained in a predetermined period of time, the focusing point at the reading scanning, where the decoding signal dt has been obtained, is kept, as it is, in the following reading scanning by the fact that the scanning instructing signal s1 and the light emission instructing signal s2 are supplied successively.

According to this method, in the case where a number of bar codes are read out one after another, an operator can read them rapidly from experience without varying significantly the distance between the bar code scanner and the recording medium, on which the bar code is represented.

In this way, when successive bar codes are read out, if the position of the focus doesn't vary, the operation can be terminated more rapidly.

The focusing position adjusting operation explained above is effected not always when the projected spot is formed most sharply, but in the state where deficiencies or dirty are produced in the bar code representation, the optimum reading position can take place, when the projected spot is in a defocused state. Differing from the auto focus mechanism, for which the focusing position is the optimum position, the device according to the present invention has no complicated structure for detecting the position of the recording medium, owing to the fact that the focusing position is moved successively in the state where the decoding is possible even in the defocused state.

Further more it is a simple modification for those skilled in the art to achieve extremely easily that the construction for the focus adjustment explained above may be located in front of the light receiving element.

Hereinbelow a second embodiment of this invention having the second technical means will be explained in detail, referring to FIG. 8.

Figure 8:
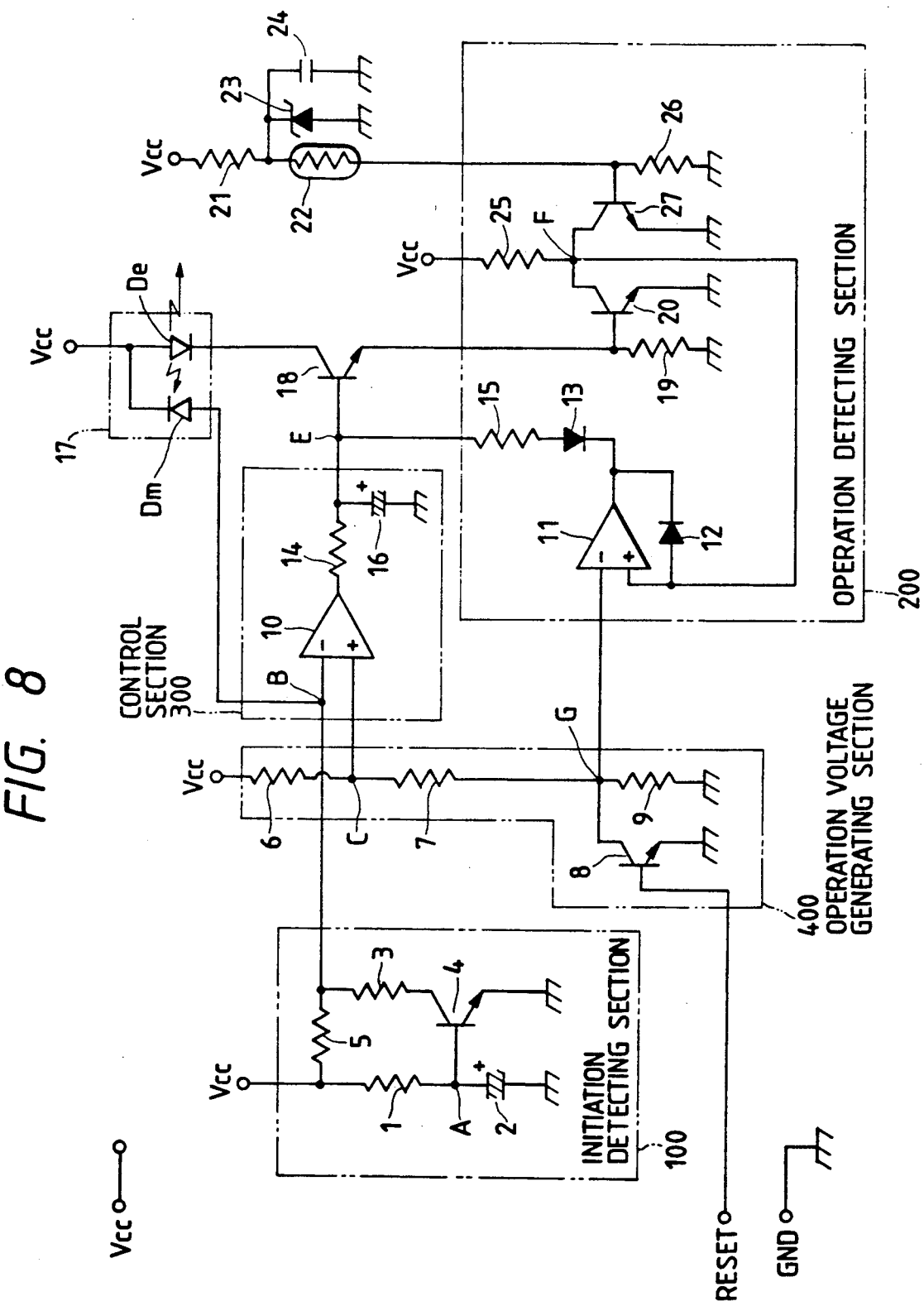
FIG. 8 is a block diagram for explaining the code reading device according to the present invention having the second and the third technical means of the present invention.

FIG. 8 is a circuit diagram illustrating the construction of the circuit according to the present invention, which can be used in the code reading device by optical reading.

In the figure reference numerals 1, 3, 5, 6, 7, 9, 14, 15, 19, 21, 25, 26 are resistances; 2, 16, 24 are capacitors; 4, 8, 18, 20, 27 are NPN type bipolar transistors; 10, 11 are two-terminal-input type operational amplifiers; 12, 13 are diodes; 17 is a monitor diode incorporation type light emitting diode unit; 22 is a temperature detecting thermistor; 23 is a Zener diode; De is a laser diode; Dm is a photo-diode; 100 is an initiation detecting section; 200 is an operation detecting section; 300 is a control section; and 400 is an operation voltage generating section.

At first, the construction of the device will be explained. In the light emitting diode unit 17 there are disposed the laser diode De for irradiating the optical recording medium with a laser light beam and the PIN type photo-diode Dm for monitoring the intensity of the light emission of this laser diode De. It is so constructed that the cathode of the photo-diode Dm is connected with the anode of the laser diode De. The power source voltage Vcc is applied to the connection of the anode of the laser diode De with the cathode of the photo-diode Dm. The anode of the photo-diode Dm is connected with the comparison input point B for effecting the control of the intensity of the light emission of the laser diode De disposed in the control section 300 explained later. The cathode of this laser diode De is connected with the collector of the driving NPN type transistor 18 for controlling the current flowing through the laser diode De. The emitter of this transistor 18 is grounded through the resistance 19 for detecting the intensity of the conduction current of the operation detecting section 200 explained later. The base of this transistor 18 is constructed as an instruction signal input point E, to which a protection instruction and conduction current intensity instruction outputted by both the operation detecting section 200 described later and the control section 300. On the other hand the laser diode De is so constructed that heat produced by the laser diode De, through which current flows, is transferred to the thermistor 22 for detecting the temperature. The power source voltage Vcc is applied through the resistance 21 to an end of this thermistor 22. The connection of this thermistor 22 with the resistance 21 is grounded through the Zener diode 23, whose cathode is connected therewith for generating a constant voltage, and the capacitor similarly for bypassing alternating current component, which are connected in parallel. The other end of the thermistor 22 is grounded through the resistance 26 disposed on the operation detection section 200 described later for detecting the intensity of the current flowing therethrough, which increases with increasing temperature of the thermistor 22.

In the initiation detecting section 100 the resistance 1 and the capacitor 2 are connected in series between the power source terminal Vcc, with which the positive pole of the power source voltage Vcc is connected, and the common ground line GND, with which the negative pole of the power source voltage Vcc is connected. The base of the NPN type transistor 4 is connected with the common connecting point A between this resistance 1 and the capacitor 2. The emitter of this transistor 4 is grounded and the collector thereof is connected with an end of the resistance 3. The power source voltage Vcc is applied to the other end of this resistance 3 through the resistance 5 set to a value extremely high with respect to the value of the resistance 3. The connection between the resistances 5 and 3 constitutes the output terminal of the initiation detecting section 100. These are constructed so as to output an initiation judging signal, which decreases relatively slowly, for preventing the destruction accident of the laser diode De at the switching on of the power source Vcc, by the fact that the value of the voltage applied to the comparison input point B in the control section 300 described later is raised to the value of a voltage, which is extremely close to the power source voltage Vcc, only during a period of time determined depending on the time constant of the resistance 1 and the capacitor 2, starting from the point of time where the power source voltage Vcc is turned on.

The bases of the NPN type transistors are connected with the connection of the resistance 19 in the operation detection section 200 with the emitter of the transistor 18 and the connection of the resistance 26 with the thermistor 22, respectively. The power source voltage Vcc is applied to the collectors of these transistors 20 and 27 through the resistance 25 for pull-up and both the emitters thereof are grounded. This circuit is so constructed that the connection F of the collectors of these transistors 20 and 27 with the resistance F supplies an anormality detection signal to the non-inverting input terminal + of the operational amplifier 11, which anormality detection signal is of "L" level, when an excessively high intensity of the current increasing with excessive increase of the current flowing through the laser diode De and with temperature rise of the thermistor 22 is found. The operational amplifier 11, to which the anormality detection signal of "L" level is supplied, is constructed so as to act as a comparator with latch holding the output state of "L" level, until it is reset. The anode and the cathode of the diode 12, through which the positive feedback current flows, are connected with the non-inverting input terminal + and output terminal of this operational amplifier 11, respectively. The value of the reference voltage Vref indicating the threshold value, which is the limit of the normal operation of the laser diode De, from the operation voltage generating section 400 described later and the value of the reset voltage Vs from the transistor 8 stated later are supplied to the inverting input terminal − of this operational amplifier 11. The cathode of the diode 13 preventing to transmit the "H" level of this output terminal to the instructing signal input point E is connected with the output terminal of this operational amplifier 11. The anode thereof is connected with one end of the resistance 15 limiting the intensity of the current flowing therethrough, when the output terminal of the operational amplifier is at the "L" level, and the other end is connected with the instructing signal input point E, which is the base of the transistor 18. The circuit is so constructed that the current flowing through a series circuit consisting of this resistance 15 and the diode 13 serves as the protection instructing signal for cancelling the current intensity instructing signal applied from the control section 300 to the instructing signal input point E, owing to the fact that the value of the voltage to be compared Vin corresponding to the voltage drop across the resistances 20 and 27 serving as a signal source exceeds the value of the voltage Vbe, at which the current begins to flow in the forward direction between the base and the emitter of the transistors 20 and 27, and at this time the value of the voltage at the connection F between the transistors 20 and 27 having the rectifying and the voltage dividing function and effecting the detection operation becomes once lower than the value of reference voltage Vref applied to the operational amplifier 11 so that the output terminal of the operational amplifier 11 is held at the "L" level, only until the value of the reset voltage Vs is applied to the inverting input terminal − of the operational amplifier 11.

The operational amplifier 10 in the control section 300 is constructed so as to work as a comparator, which outputs the "H" level, when the value of the voltage applied to the comparison input point B of the control section 300, where the initiation detecting signal is applied to the inverting terminal − of the operational amplifier 10, connected with the anode of the photodiode Dm as well as the resistances 3 and 5 exceeds the value of the reference voltage applied from the operation voltage generating section 400 stated later to the non-inverting input terminal + of this operational amplifier 10, and the "L" level, when the former becomes lower than the latter. The output terminal of the operational amplifier 10 is grounded through the resistance 14 and the capacitor 16. The connection E of the resistance 14 with the capacitor 16 in the control section 300 is connected with the base of the transistor 18 driving the laser diode De. The series circuit consisting of the resistance 14 and the capacitor 16 is constructed as an integrating circuit outputting a value of a DC voltage proportional to the ratio in time, with which the output terminal of the operational amplifier 10 outputs the "H" level.

In the operation voltage generating means 400 a series circuit consisting of the resistance 6, the resistance 8 and the resistance 8 is connected between the voltage source Vcc and the ground line GND. It is so constructed that the value of the voltage indicating the intensity of the light emitted by the laser diode De is supplied from the connection C between the resistance 6 and the resistance 7 to the non-inverting input terminal + of the operational amplifier 11 and that the value of the voltage indicating the holding and releasing operation is supplied from the connection G between the resistance 7 and the resistance 8 to the inverting input terminal − of the operational amplifier 11. The collector of the transistor 8 for the reset is also connected with this connection G. The emitter of this transistor 8 is grounded. As far as a reset signal of "H" level is applied to the base of the transistor 8, the collector and the emitter of the transistor 8 are in the low impedance state. As far as a reset signal of "L" level is applied to the base of the transistor 8, the value of the reference voltage Vcf indicating the center value of the intensity of the light emitted by the laser diode De is outputted from the connection C and the value of the reference voltage Vref indicating the threshold value of the holding operation of the operational amplifier 11 is outputted from the connection D. As far as a reset signal of "H" level is applied to the base of the transistor 8, a value of the voltage Vcr indicating an intensity of the light emission lower than the central value of the intensity of the light emitted by the laser diode De is outputted from the connection C and a value of the reset voltage Vs indicating the releasing operation of the holding state of the operational amplifier 11 is outputted from the connection G.

Hereinbelow the operation of the construction described above will be explained.

At first, when the power source of the code reading device is switched on, the potential at the non-inverting input terminal + (connection C) of the operational amplifier 10 arrives at the same time as the switch-on of the power source Vcc at the value of the reference voltage Vcf indicating the central value of the intensity of the light emitted by the laser diode De, expressed by the following equation;

$$Vcf = Vcc \cdot (R7 + R9)/(R6 + R7 + R9)$$

On the contrary, the potential at the inverting input terminal − (connection B) of the operational amplifier 10 rises according to predetermined characteristics together with the potential of the connection A, which rises with a certain time constant determined by the time constant circuit consisting of the resistance 1 and the capacitor 2 and an initiation judging current Isd flows through the path of power source Vcc → resistance 5 → resistance 3 → from collector to emitter of the transistor 4 → ground line GND with the rising potential at the connection A. This initiation judging current Isd charges the capacitor 2 and increases relatively slowly, corresponding to the base current Ibe4, which is made flow by the fact that the voltage Veb4 applied between the base and the emitter of the transistor 4 arrives at a predetermined value (e.g. + 0.06 V), until it is saturated, depending on the resistance 1 and the current amplification factor $h_{fe}$ of the transistor 4. The potential at the connection B, which rises according to the increasing characteristics of the intensity of this base current Ice4 descends to a potential, obtained by dividing the power source voltage by the resistance 5 set to a relatively high resistance value on one side and the resistance 3 set to a relatively low resistance value and the circuit between the collector and the emitter of the transistor 4 on the other side, which is somewhat lower than the value of the reference voltage Vcf at the connection C. Corresponding thereto, the potential at the connection E rises to a value of the voltage, with which a value of the driving current giving rise to an intensity of light somewhat higher than the central value of the light intensity emitted by the laser diode De by the fact that the ratio in time, with which the "H" level signal is outputted from the output terminal of the operational amplifier 10, increases gradually. Consequently the intensity of the driving current flowing through the laser diode De rises not rapidly at the switch-on of the power source and thus a so-called soft start is effected so that the intensity of the emitted light rises with an appropriate speed, until an intensity of emitted light arrives at a predetermined value.

The intensity of the light emitted by the laser diode De is detected by the photo-diode Dm and in the case where the detected light intensity is higher than the set light intensity, the signal is negatively fedback from the photo-diode Dm so that the potential at the connection B is higher than the value of the reference voltage Vcf applied to the connection C, as explained later. In this way the value of the voltage at the connection E descends so that the intensity of the emitted light is reduced. Similarly, in the case where the intensity of emitted light is lower than the set intensity, the signal is negatively fedback from the photo-diode Dm so that the potential at the connection B is lower than the value of the reference voltage Vcf applied to the connection C. In this way the value of the voltage at the connection E rises so that the intensity of the emitted light is increased. Consequently the intensity of the light, with which the optical recording medium is irradiated, by the laser diode De is stabilized in a stationary state, depending on the value of the reference voltage Vcf applied to the connection C.

In the photo-diode Dm, to which a bias voltage is applied in the backward direction, the impedance RIDm in the backward direction produced between the cathode and the anode inversely proportionally to the increase in the intensity of the light illuminating the photo-diode Dm decreases. Together with this decrease of the impedance RIDm, the monitor current Im flowing through the path of power source Vcc → from anode to cathode of the photo-diode Dm → resistance 3 → from collector to emitter of the transistor 4 → ground line GND increases. Supposing a case where the value of the base current Ib8 limited by the value of the resistance R1 ($\Omega$) of the resistance 1 and flowing through the transistor 4 from the base to the emitter becomes constant in the state where the voltage measured at the two extremities of the capacitor. 2 is saturated, denoting the value of the power source voltage by Vcc (V), the internal resistance of the power source by Rcc ($\Omega$), the impedance in the backward direction between the cathode and the anode of the photo-diode Dm by RIDm ($\Omega$), the resistance value of the resistance 3 by R3 ($\Omega$), the value of the divided voltage given at this time between the collector and the emitter of the transistor 4 by Vce4 (V), and the internal resistance at this time between the collector and the emitter of the transistor 4 by Rce8 ($\Omega$), the value of the monitor current Im (A) has a value of the negative feedback expressed by the following equation:

$$Im = (Vcc - Vce4)/(RIDm + R3 + Rce8)$$

Denoting the resistance value of the resistance 5 by R5 ($\Omega$), the initiation judgment current Isd (A) flowing through the path of power source Vcc → resistance 5 → resistance 3 → from collector to emitter of the transistor 4 → ground line GND, in the state where the value of the base current Ib8 flowing through the transistor 4 between the base and the emitter limited by the value of the resistance R1 ($\Omega$) of the resistance 1 is constant when the voltage between the two terminals of the capacitor 2 is saturated, has a value expressed by the following equation;

$$Isd = (Vcc - Vce4)/(R3 + R5 + Rce8)$$

Consequently a resultant current Isd + Im of the initiation judgment current Isd and the monitor current Im flows through the path of resistance 3 → from collector to emitter of the transistor 4 → ground line GND and controlled by a closed loop so as to approach the value of the reference voltage at the connection C, the potential VB (V) at the connection B in the stationary state has a value expressed by the following equation;

$$VB = (Isd + Im)(R3 + R5 + Rce8) + Vce4$$

Next the protecting operation in the state where an excessive driving current IDe flows through the laser diode De will be explained. The driving current IDe is made flow through the path of power source Vcc → from anode to cathode of the laser diode De → from collector to emitter of the transistor 18 → resistance 19 → ground line GND. The state where the value of the driving current IDe is excessive takes place by the fact that e.g. when the instructing signal input VE from the control section 300 is applied at a high potential by some cause, an excessively high current is made flow through the laser diode De, which tends to destroy it. A current detection signal VR19 produced at this time between the two terminals of the resistance 19 corresponding to the value of the voltage to be compared Vin rises to a level exceeding the base-emitter voltage Vbe20 of the transistor 20 and thus a base current Ibe20 flows through the transistor 20 between the base and the emitter. In this way an excessive current detection value Ice20 depending on the value of the base current Ibe20 flows through the path of power source Vcc → resistance 25 → from collector to emitter of the transistor 20 → ground line GND. At this time the potential at the connection F, through which the excessive current detection value Ice20 flows, becomes lower than the value of the reference voltage Vref applied to the inverting input-of the operational amplifier 11. Consequently the output terminal of the operational amplifier 11 is shifted to the "L" level and kept. Thus the protection instructing signal is applied to the connection E. Since the current intensity instructing signal applied from the control section 300 to the instructing signal input point De passes through the path of resistance 15 → from anode to cathode of the diode 13 → from output terminal of the operational amplifier 11 to negative power supplying terminal not shown in the figure → ground line GND, a state where the potential at the connection E is lowered is realized and further since no base current Ibe18 flows through the transistor 18, the driving current to the laser diode De in the state where the protection instructing signal is applied is interrupted and a protecting operation state where this driving current is cancelled is realized. At the same time as the state enters this protecting operation state, a positive feedback current flows through the path of power source Vcc → from anode to cathode of the diode 12 → from output terminal of the operational amplifier 11 to negative power supplying terminal not shown in the figure → ground line GND. In the holding operation state where the positive feedback current flows through the common connecting point F of the collectors of the transistors 20 and 26, the resistance 25, and the anode of the diode 12, even if the current detection signal VR19 becomes lower than the base-emitter voltage Vbe20 of the transistor 20, the potential applied to the non-inverting input terminal − of the operational amplifier 11 exceeds never the value of the reference voltage Vref. Furthermore, even if a voltage higher than the value of the reference voltage Vref is applied to the base of the transistors 19 and 26, this state is never transmitted to the collectors of the transistors 19 and 26, the holding operation continues to be maintained.

Next the protecting operation in the state where the temperature approaches that of the destruction of the laser diode De will be explained. Even in the state where the driving current having an intensity lower than an excessive current flows through the laser diode De, the probability of the destruction of the laser diode De is high, if the temperature thereof rises. This temperature rise is transferred to the thermistor 22 and the value of the impedance of the thermistor 22 is lowered. The power source voltage Vcc is stabilized by a voltage stabilizing circuit consisting of the resistance 21, the Zener diode 23 and the capacitor 24 and an excessive current obtained by dividing the value of this stabilized voltage by the sum of the value of the impedance of the thermistor 22 and the resistance 26 flows through the thermistor 22. At this time a current intensity detecting signal produced between the two terminals of the resistance 26 corresponding to the value of the voltage to be compared Vin rises to a level higher than the base-emitter voltage Vbe27 of the transistor 27 and the base current Ibe27 flows through the transistor 27 between the base and the emitter. An excessive current detection value depending on the value of the base current Ibe27 flows through the path of resistance 25 → from collector to emitter of the transistor 27 → ground line GND in this state. The potential at the connection F, through which this excessive current detection value Ice20 flows, is lower than the value of the reference voltage Vref applied to the inverting input − of the operational amplifier 11. Consequently the output terminal of the operational amplifier 11 is shifted to the "L" level and held and the protection instructing signal is applied to the connection E. The driving current to the laser diode in the state where the protection instructing signal is applied is cancelled by the fact that the current intensity instructing signal applied from the control section 300 to the instructing signal input point E flows through the path of resistance 15 → from anode to cathode of the diode 13 → from output terminal of the operational amplifier 11 to negative power source supplying terminal not shown in the figure → ground line GND. Since no base current Ibe18 flows through the transistor 18, the transistor 18 is cut off and the protecting operation state is realized. Furthermore, in this state, a holding current flows through the path of power source Vcc → from anode to cathode of the diode 12 → from output terminal of the operational amplifier 11 to negative power source terminal not shown in the figure → ground line GND so that the potential at the connection F is approximately equal to the forward direction voltage value VFD12 allotted to the diode 12 between the anode and the cathode by the voltage division. Consequently, since it exceeds never the value of the reference voltage Vref applied to the inverting input terminal − of the operational amplifier 11, it is held similarly to the protecting operation by the excessive current.

Next the reset operation to return the protecting operation by the excessive current and the excessive heat to the original state will be explained. A pulse signal of "H" level supplied from the reset instructing circuit not shown in the figure, e.g. by a manual operation, etc., is applied to the reset terminal. The collector-emitter circuit of the transistor 8 is made conductive by this pulse signal. Denoting the resistance value of the resistance 6 by R6 ($\Omega$), the resistance value of the resistance 7 by R7 ($\Omega$), and the value of the voltage allotted to the conductive transistor 8 between the collector and the emitter by the voltage division by Vce8 (V), the value of the reset voltage Vs (V) applied to the inverting input terminal of the operational amplifier 11, which voltage is equal to the potential at the connection G, is equal to the voltage value represented by the following equation;

$$Vs = Vcc - (R6 + R7)(Vcc - Vce8)/(R6 + R7)$$

In the operational amplifier 11, to which this value of the reset voltage Vs (V) is once applied, at this time, since the value of the reset voltage Vs (V) becomes lower than the value of the forward voltage VFD12 applied to the non-inverting input terminal +, the output terminal is shifted to the "H" level and the holding state is reset. The potential Vcr (V) at the terminal C as far as the value of the reset voltage Vs (V) is applied to the operational amplifier 11 has a value, which is lower than the value of the reference voltage Vcf indicating the central value of the intensity of the light emitted by the laser diode De, and which is expressed by the following equation;

$$Vcr = Vce8 + (Vcc - Vce8) \cdot R7/(R6 + R7)$$

An instructing signal for starting again the operation is supplied from the control section 300, to which the value of the reference voltage Vcr instructing this low intensity of the emitted light is applied, to the base of the transistor 18. When the reset terminal is returned to the "L" level, an instructing signal instructing the emission of the light in the stationary state is supplied from the control section 300. Consequently, in the new starting state, since an instructing signal to increase stepwise the intensity from the value of the reference voltage Vcr instructing a low intensity of the emitted light to the value of the reference voltage Vcr instructing a intensity of the emitted light in the stationary state, stress given to the laser diode De is small. Further, in the case where an improper state is detected again by the operation detecting section 200, if the driving function of the transistor 18 is normal, the interruption of the driving current IDe is effected in the state where the stress given to the laser diode De is small.

Although the initiation detecting section 100 explained in the above embodiment is so constructed that the initiation instructing signal at the switch-on of the power source is obtained by integrating the applied power source voltage, this invention is not restricted thereto, but it can be modified to a digital circuit, which generates an initiation instructing signal for effecting a soft start operation predetermined on the basis that the power source has been switched on. Further, although both the initiation instructing signal from the initiation detecting section 100 and the negative fedback value from the monitor diode Dm are supplied to the inverting input terminal − (connection B), which is the control terminal of the control section 300 explained in the above embodiment, it is a matter of course that the input terminal can be changed to the non-inverting input terminal + side of the control section 300, if the design is changed so that the polarity of the initiation instructing signal of the initiation detecting section 100 is inverted.

Still further, even if the resistance 19 for detecting the value of the driving current IDe connected in series with the laser diode De is set to a relatively low resistance value with respect to the resistance 73 for limiting current used in the prior art example, since it is current-controlled by the transistor 18 on the basis of the negative feedback value of the monitor diode Dm, it can be operated without any special problem.

Since the semiconductor laser driving circuit thus constructed is current-controlled by the transistor 18, it can be operated stably even with a relatively low value of the power source voltage Vcc and thus it is very convenient to apply it to hand held type apparatuses, which widens the field of the practical use thereof.

Hereinbelow a third embodiment of this invention having the third technical means will be explained in detail, referring to FIGS. 8 to 10.

FIGS. 9(a) to 9(f) are circuit diagram illustrating the construction of the circuit according to the present invention; FIGS. 10(a) to 10(d) are schemes showing waveforms for explaining the working mode of the circuit construction according to the present invention; and FIG. 8 is a circuit diagram of the semiconductor laser drive control device, to which the present invention is applied.

In the figures reference numerals 1, 3, 5, 6, 7, 9, 14, 15, 19, 21, 25, 26, 59, 61, 62 are resistances; 2, 16, 24 are capacitors; 4, 8, 18, 20, 27 are NPN type bipolar transistors; 10, 11, 51 are two-terminal-input type operational amplifiers; 12, 13, 57, 58 are diodes; 17 is a monitor diode incorporation type light emitting diode unit; 22 is a temperature detecting thermistor; 23 is a Zener diode; 53 is an input terminal; 54 is a reference voltage generating circuit; 55 is a reset terminal; 56 is an output terminal; 60 is a reset voltage generating circuit; De is a laser diode; Dm is a photo-diode; Sr is a reset switch; 100 is an initiation detecting section; 200 is an operation detecting section; 300 is a control section; and 400 is an operation voltage generating section.

At first, the basic construction of the device according to the present invention will be explained, referring to FIGS. 9(a) and 9(b).

Figure 9A:
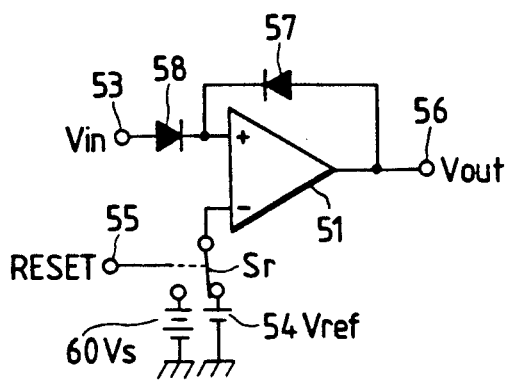
FIGS. 9(a) to 9(f) and FIG. 10 are schemes for explaining the code reading device according to the present invention having the third technical means of the present invention.

The operational amplifier 51 indicated in FIG. 9(a) is so constructed that the negative power source terminal not indicated in the figures is connected with the ground line, while the positive power source terminal not indicated in the figures is connected with the positive pole of the power source Vcc so as to effect a comparing operation. The cathode of the diode 57 serving as positive feedback means is connected with the non-inverting input +, which is the comparing input terminal of this operational amplifier 51 and the anode thereof is connected with the output terminal 56 of the operational amplifier 51 so that the positive feedback current is supplied from the output terminal 56 to the non-inverting input terminal +.

The cathode of the diode 58, which is voltage dividing means, is connected with the common connection between this non-inverting input + and the cathode of the diode 57 and this cathode is connected with the input terminal 53, to which the input signal Vin, which is the voltage to be compared, is supplied so that the signal current is supplied from the input terminal 53 to the non-inverting input terminal +.

On the other hand the common terminal of the reset switch is connected with the inverting input terminal − serving as the reference input terminal of the operational amplifier 51 and the reference voltage generating circuit 54 and the reset voltage generating circuit 60 are connected with the first and the second switching terminal of this reset switch Sr, respectively. This reset switch Sr is so constructed that depending on the reset instruction applied to the reset terminal 55, it is turned on from the comparing operation state where the reference voltage Vref from the reference voltage generating circuit 54 is applied to the inverting input terminal − to the returning operation state from the holding operation where the reset voltage Vs from the reset voltage generating circuit 60 is applied to the inverting input terminal −. In such a structure, in which the output signal Vout at the output terminal 56 is inverted when the input signal Vin is great with respect to the reference voltage Vref, the reset voltage is set so as to be higher than the reference voltage Vref.

Figure 9B:
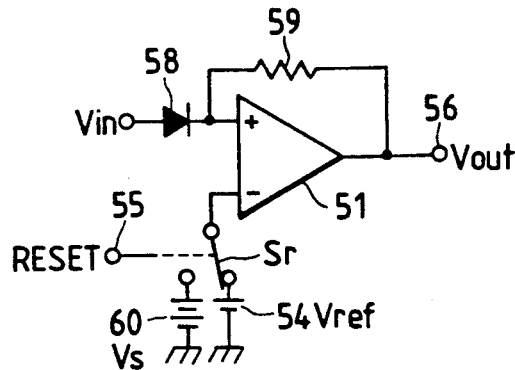

In the construction indicated in FIG. 9(b), only the diode 57, which is positive feedback means in the construction indicated in FIG. 9(a), is replaced by the resistance 59.

Figure 9C:
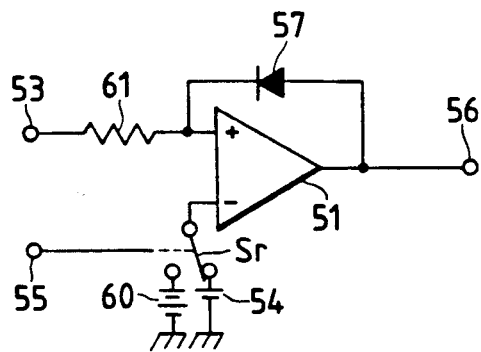

In the construction indicated in FIG. 9(c), only the diode 57, which is voltage dividing means in the construction indicated in FIG. 9(a), is replaced by the resistance 61.

Figure 9D:
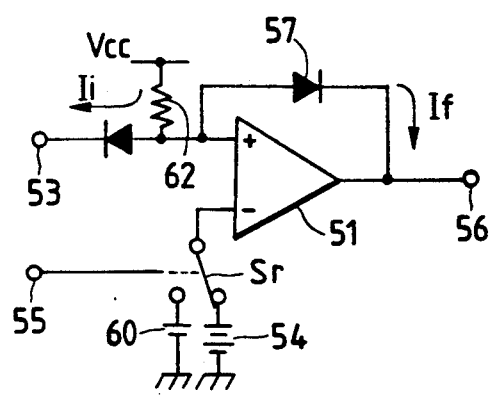
Figure 9E:
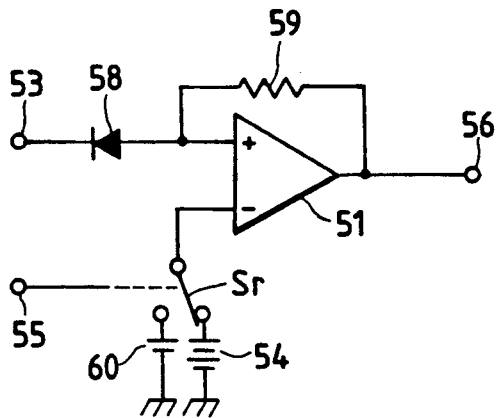
Figure 9F:
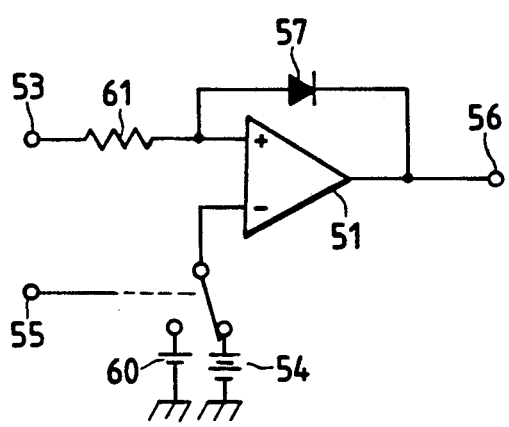

In the construction where the output signal Vout at the output terminal 56 is inverted when the input signal Vin is smaller than the reference voltage Vref, the reset voltage is set so as to be lower than the reference voltage Vref, as indicated in FIGS. 9(d), 9(e) and 9(f). These circuits are so constructed that FIG. 9(d) corresponds to FIG. 9(a); FIG. 9(b) corresponds to FIG. 9(e); and FIG. 9(c) corresponds to FIG. 9(f). A pull up voltage is always applied from the positive pole of the power source Vcc through the resistance 62 to the non-inverting input terminal +.

Now the operation will be explained, referring to FIGS. 10(a) and 10(b).

Figures 10A, 10B:
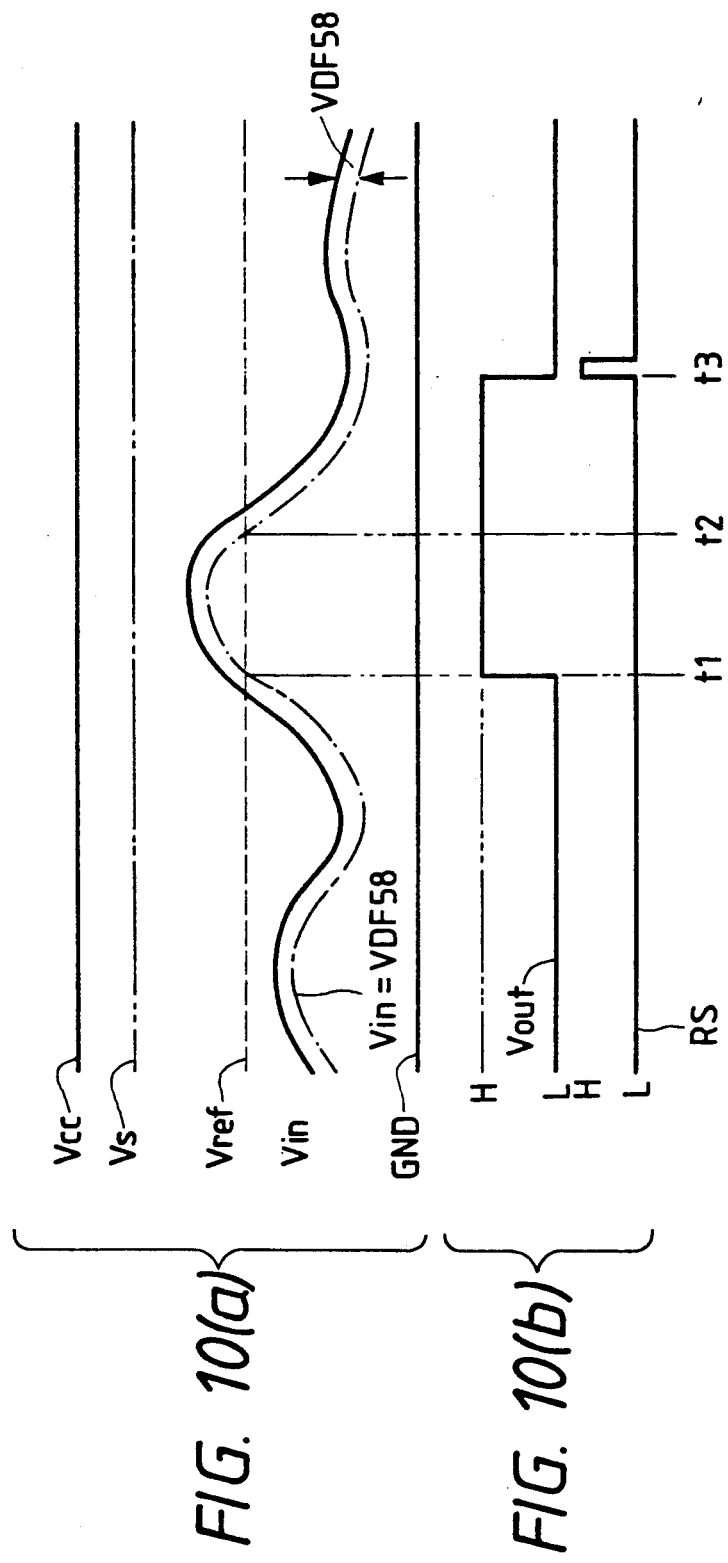

When the input signal Vin indicated by a full line in FIG. 10(a) is applied to the input terminal 53, a substraction value Vin − VDF58 obtained by substracting the voltage VDF58 in the forward direction across the diode 58 from the input signal Vin, which is indicated in the chain-dotted line in FIG. 10(a), exceeds the reference voltage Vref indicated by the broken line in FIG. 10(a) at a point of time t1 in FIG. 10(a) and thus the output signal Vout indicated in FIG. 10(b) is changed to the "H" level. The output signal Vout changed to the "H" level exceeds the voltage VDF57 in the forward direction across the diode 57 and thus the positive feedback current flows therethrough. In this way the state where the output signal Vout is changed to the "H" level. This state of the output signal Vout is stably maintained, because the value of the voltage Vin − VDF58 applied to the non-inverting input terminal + exceeds never the voltage in the backward direction of the diode 58 owing to the positive feedback current, which is made flow therethrough, and the input impedance of the non-inverting input terminal + is set so as to be extremely high. The holding operation maintained by this value of the voltage Vin − VDF57 is continued to be held, even if the substraction value Vin − VDF58 becomes lower than the reference voltage Vref at the point of time t2 in FIG. 10(a), because no current flows through the diode in the backward direction.

When a pulse reset signal RS of "H" level indicated in FIG. 10(b) is supplied, a value of the reset voltage Vs outputted by the reset signal generating circuit 60, which is indicated by a two-dot-one-dash line in FIG. 10(a) and which is higher than the reference voltage Vref, is applied for a short time to the inverting input terminal − through the reset switch. As the result, the output signal Vout indicated in FIG. 10(b) is changed to the "L" level and the holding state is removed. After the termination of this removing operation of short time, the comparing operation is effected in the state where the output signal Vout is at the "L" level, until the subtraction value Vin − VDF58 exceeds the reference voltage Vref at the next time.

In the circuit construction indicated in FIG. 9(b), current through the resistance 59, which is set to a relatively high impedance value on the basis of the difference between the substraction value Vin −

VDF58 and the output signal Vout at the "L" level, is made flow to the output terminal 56. However, almost all the subtraction value Vin − VDF58 applied to the non-inverting input terminal + is divided by the resistance 59 and a value, which is very close to the "L" level at the output terminal 56 is applied to an input terminal of a load, whose input impedance value is set so as to be high with respect to the output impedance value of the output terminal 56 at the "L" level state, connected with the output terminal 56.

Then the positive feedback current If is made flow through the resistance 59 on the basis of the output signal Vout at the "H" level state and the procedure proceeds to the holding operation. A subtraction value Vout − R59·If obtained by subtracting the voltage drop across the resistance 59, through which the feedback current If flows, from the output voltage Vout is applied to the non-inverting input terminal + in this case. This applied voltage approaches a value, which is approximately equal to the output voltage Vout, in a relatively short time. Since in this holding operation no discharge takes place through the diode 58, the holding operation is maintained similarly to the case by the circuit construction indicated in FIG. 9(a).

In the circuit construction indicated in FIG. 9(c), a subtraction value Vin − R61·Ii obtained by subtracting from the input signal Vi a value R61·Ii obtained by the voltage division due to an extremely short and weak input current Ii responding to variations in the input signal Vin applied to the resistance 61, whose impedance is set to a relatively high value. When an extremely short predetermined period of time measured from the point of time, where variations in the input signal Vin disappeared, has lapsed, a voltage value having the same level as the input signal Vin applied to the input terminal 58 is applied to the non-inverting input +. These voltages applied to the non-inverting input + are obstructed by the diode 57 and never applied to the load connected with the output terminal 56. As the result, no erroneous operations take place, even if a load, whose input impedance value is relatively low with a low driving voltage with respect to the maximum value of the input signal Vin, is connected with the output terminal 56.

When the value of the voltage applied to the non-inverting input + exceeds the reference voltage Vref, the output signal Vout is changed to the "H" level and the positive feedback current is made flow through the diode 57. Thus the procedure enters the holding operation. Since the value of the series impedance R61 + Rin of the output impedance of the signal supplying circuit connected with the input terminal 53 and the resistance 61 is very high, the value (Vout − VDF57 − Vin)/(R61 + Rin) of the current made flow through the resistance 61 by the potential difference Vout − VDF57 − Vin between the value of the voltage Vout − VDF57 applied to the non-inverting terminal + and the input voltage Vin at the input terminal 53 is very small. Therefore a voltage value (R61 + Rin)·(Vout − VDF57 − Vin)/(R61 + Rin), which is slightly lower than the voltage value Vout − VDF57, is applied to the non-inverting input + and the holding operation is continued to be maintained.

In the circuit construction indicated in FIG. 9(d), the positive pole power source voltage Vcc is applied always to the non-inverting input terminal + serving as the comparison input terminal through the resistance 62. The power source voltage Vcc is continued to be applied to the non-inverting terminal +, until at least one of the signal current Is of the signal source from the diode 58, which is voltage dividing means, and the positive feedback current If from the diode 57, which is positive feedback means, towards the output terminal 56 of the operational amplifier 51 is made flow to the common ground line GND, which is the negative pole of the power source. In this state, since the value of the power source voltage Vcc applied to the non-inverting input terminal + becomes never lower than the reference voltage Vref of the reference voltage generating circuit 54 applied to the inverting input terminal − serving as the reference input terminal, the output signal Vout of "H" level, which is approximately equal to the voltage value Vcc at the positive pole of the power source, is continued to be outputted from the output terminal 56 of the operational amplifier 51.

Then the voltage value of the input signal Vin applied to the input terminal 53 decreases gradually and when it becomes lower than the substraction value Vcc − VDF58 obtained by substracting the forward direction voltage VDF58 across the diode 58 from the voltage value of the power source Vcc, the signal current Is is made flow through the path of power source voltage Vcc at the positive pole → resistance 62 → diode 58 → signal source → ground line GND in this order. In the state where the value of the voltage drop Is·R62 produced across the resistance 62 by the value of this signal current Is exceeds the substraction value Vref − VDF58 obtained by subtracting the forward direction voltage VDF58 from the reference voltage Vref, since the addition value Vin + VDF58 obtained by adding the forward direction voltage VDF58 of the diode 58 to the input signal Vin applied to the non-inverting input terminal + becomes lower than the reference voltage Vref at the inverting input terminal −, the output signal Vout of "L" level, which is approximately equal to the GND level at the negative pole of the power source, is outputted through the output terminal 56 of the operational amplifier 56. By the output signal Vout at the output terminal 56 in this state, the positive feedback current If is made flow through the path of resistance 62 → diode 57 → output terminal 56 → ground line GND. As the result, even if the input signal Vin rises and the signal current Is is interrupted, the subtraction value Vcc − If·R62 − VDF57 obtained by subtracting the value of the voltage drop If·R62 produced across the resistance 62 by the positive feedback current If and the forward direction voltage VDF57 across the diode 57 from the value of the power source voltage Vcc applied to the non-inverting input terminal + exceeds never the reference voltage Vref, the "L" level output state is continued to be maintained.

In the state where the addition value Vin + VDF58 obtained by adding the forward direction voltage VDF57 across the diode 57 to the input signal Vin exceeds the reference voltage Vref, by the fact that the reset signal RS is supplied to the reset switch Sr, the reset voltage Vs from the reset voltage generating circuit 60, which becomes lower than the subtraction value Vcc − If·R62 − VDF57, is applied to the inverting input terminal − and thus the output signal Vout held at the "L" level returns to the "H" level.

In the circuit construction indicated in FIG. 9(e), when the output signal Vout is changed to the "L" level, the potential at the non-inverting input terminal + is moved to a potential, which is approximately equal to the "L" level, through the resistance 59 serving as the positive feedback means and the state where the input signal Vin doesn't exceed the backward direction voltage VDR 58 of the diode 62 is maintained.

In the circuit construction indicated in FIG. 9(f), a decreased input signal Vin is applied through the resistance 61; the potential at the non-inverting input terminal + becomes lower than the reference voltage Vref; and thus the output signal Vout is moved to the "L" level and maintained. Even if the reset voltage Vs is applied to the inverting input terminal − and the output voltage Vout is changed to the "H" level, since the output signal Vout of "H" level never exceeds the backward direction voltage VDR57 of the diode 57, the output voltage Vout continues to return.

Further, if the diodes 57 and 58 described above are replaced by a construction rectifying the flow of signals by means of transistors, buffer amplifiers, etc., the device can be operated in the same way.

Hereinbelow and embodiment, in which a comparator with latch according to the present invention is applied to a semiconductor laser driving control device used for an optical reading device, etc., will be explained in detail, referring to FIG. 8.

At first, the construction of the device will be explained. In the light emitting diode unit 17 there are disposed the laser diode De for irradiating the optical recording medium with a laser light beam and the PIN type photo-diode Dm for monitoring the intensity of the light emission of this laser diode De. It is so constructed that the cathode of the photo-diode Dm is connected with the anode of the laser diode De. The power source voltage Vcc is applied to the connection of the anode of the laser diode De with the cathode of the photo-diode Dm. The anode of the photo-diode Dm is connected with the comparision input point B for effecting the control of the intensity of the light emission of the laser diode De disposed in the control section 300 explained later. The cathode of this laser diode De is connected with the collector of the driving NPN type transistor 18 for controlling the current flowing through the laser diode De. The emitter of this transistor 18 is grounded through the resistance 19 for detecting the intensity of the conduction current of the operation detecting section 200 explained later. The base of this transistor 18 is constructed as an instruction signal input point E, to which a protection instruction and conduction current intensity instruction outputted by both the operation detecting section 200 described later and the control section 300. On the other hand the laser diode De is so constructed that heat produced by the laser diode De, through which current flows, is transferred to the thermistor 22 for detecting the temperature. The power source voltage Vcc is applied through the resistance 21 to an end of this thermistor 22. The connection of this thermistor 22 with the resistance 21 is grounded through the Zener diode 23, whose cathode is connected therewith for generating a constant voltage, and the capacitor similarly for bypassing alternating current component, which are connected in parallel. The other end of the thermistor 22 is grounded through the resistance 26 disposed on the operation detection section 200 described later for detecting the intensity of the current flowing therethrough, which increases with increasing temperature of the thermistor 22.

In the initiation detecting section 100 the resistance 1 and the capacitor 2 are connected in series between the power source terminal Vcc, with which the positive pole of the power source voltage Vcc is connected, and the common ground line GND, with which the negative pole of the power source voltage Vcc is connected. The base of the NPN type transistor 4 is connected with the common connecting point A between this resistance 1 and the capacitor 2. The emitter of this transistor 4 is grounded and the collector thereof is connected with an end of the resistance 3. The power source voltage Vcc is applied to the other end of this resistance 3 through the resistance 5 set to a value extremely high with respect to the value of the resistance 3. The connection between the resistances 5 and 3 constitutes the output terminal of the initiation detecting section 100. These are constructed so as to output an initiation judging signal, which decreases relatively slowly, for preventing the destruction accident of the laser diode De at the switching on of the power source Vcc, by the fact that the value of the voltage applied to the comparison input point B in the control section 300 described later is raised to the value of a voltage, which is extremely close to the power source voltage Vcc, only during a period of time determined depending on the time constant of the resistance 1 and the capacitor 2, starting from the point of time where the power source voltage Vcc is turned on.

The bases of the NPN type transistors are connected with the connection of the resistance 19 in the operation detection section 200 with the emitter of the transistor 18 and the connection of the resistance 26 with the thermistor 22, respectively. The power source voltage Vcc is applied to the collectors of these transistors 20 and 27 through the resistance 25 for pull-up and both the emitters thereof are grounded. This circuit is so constructed that the connection F of the collectors of these transistors 20 and 27 with the resistance F supplies an anormality detection signal to the non-inverting input terminal + of the operational amplifier 11, which anormality detection signal is of "L" level, when an excessively high intensity of the current increasing with excessive increase of the current flowing through the laser diode De and with temperature rise of the thermistor 22 is found. The operational amplifier 11, to which the anormality detection signal of "L" level is supplied, is constructed so as to act as a comparator with latch holding the output state of "L" level, until it is reset. The anode and the cathode of the diode 12, through which the positive feedback current flows, are connected with the non-inverting input terminal + and output terminal of this operational amplifier 11, respectively. The value of the reference voltage Vref indicating the threshold value, which is the limit of the normal operation of the laser diode De, from the operation voltage generating section 400 described later and the value of the reset voltage Vs from the transistor 8 stated later are supplied to the inverting input terminal − of this operational amplifier 11. The cathode of the diode 13 preventing to transmit the "H" level of this output terminal to the instructing signal input point E is connected with the output terminal of this operational amplifier 11. The anode thereof is connected with one end of the resistance 15 limiting the intensity of the current flowing therethrough, when the output terminal of the operational amplifier is at the "L" level, and the other end is connected with the instructing signal input point E, which is the base of the transistor 18. The circuit is so constructed that the current flowing through a series circuit consisting of this resistance 15 and the diode 13 serves as the protection instructing signal for cancelling the current intensity instructing signal applied from the control section 300 to the instructing signal input point E, owing to the fact that the value of the voltage to be compared Vin corresponding to the voltage drop across the resistances 20 and 27 serving as a signal source exceeds the value of the voltage Vbe, at which the current begins to flow in the forward direction between the base and the emitter of the transistors 20 and 27, and at this time the value of the voltage at the connection F between the transistors 20 and 27 having the rectifying and the voltage dividing function and effecting the detection operation becomes once lower than the value of reference voltage Vref applied to the operational amplifier 11 so that the output terminal of the operational amplifier 11 is held at the "L" level, only until the value of the reset voltage Vs is applied to the inverting input terminal − of the operational amplifier 11.

The operational amplifier 10 in the control section 300 is constructed so as to work as a comparator, which outputs the "H" level, when the value of the voltage applied to the comparison input point B of the control section 300, where the initiation detecting signal is applied to the inverting terminal − of the operational amplifier 10, connected with the anode of the photodiode Dm as well as the resistances 3 and 5 exceeds the value of the reference voltage applied from the operation voltage generating section 400 stated later to the non-inverting input terminal + of this operational amplifier 10, and the "L" level, when the former becomes lower than the latter. The output terminal of the operational amplifier 10 is grounded through the resistance 14 and the capacitor 16. The connection E of the resistance 14 with the capacitor 16 in the control section 300 is connected with the base of the transistor 18 driving the laser diode De. The series circuit consisting of the resistance 14 and the capacitor 16 is constructed as an integrating circuit outputting a value of a DC voltage proportional to the ratio in time, with which the output terminal of the operational amplifier 10 outputs the "H" level.

In the operation voltage generating means 400 a series circuit consisting of the resistance 6, the resistance 8 and the resistance 8 is connected between the voltage source Vcc and the ground line GND. It is so constructed that the value of the voltage indicating the intensity of the light emitted by the laser diode De is supplied from the connection C between the resistance 6 and the resistance 7 to the non-inverting input terminal + of the operational amplifier 11 and that the value of the voltage indicating the holding and releasing operation is supplied from the connection G between the resistance 7 and the resistance 8 to the inverting input terminal − of the operational amplifier 11. The collector of the transistor 8 for the reset is also connected with this connection G. The emitter of this transistor 8 is grounded. As far as a reset signal of "H" level is applied to the base of the transistor 8, the collector and the emitter of the transistor 8 are in the low impedance state. As far as a reset signal of "L" level is applied to the base of the transistor 8, the value of the reference voltage Vcf indicating the center value of the intensity of the light emitted by the laser diode De is outputted from the connection C and the value of the reference voltage Vref indicating the threshold value of the holding operation of the operational amplifier 11 is outputted from the connection D. As far as a reset signal of "H" level is applied to the base of the transistor 8, a value of the voltage Vcr indicating an intensity of the light emission lower than the central value of the intensity of the light emitted by the laser diode De is outputted from the connection C and a value of the reset voltage Vs indicating the releasing operation of the holding state of the operational amplifier 11 is outputted from the connection G.

Hereinbelow the operation of the construction described above, referring to FIG. 8, will be explained.

At first, when the power source of the code reading device is switched on, the potential at the non-inverting input terminal + (connection C) of the operational amplifier 10 arrives at the same time as the switch-on of the power source Vcc at the value of the reference voltage Vcf indicating the central value of the intensity of the light emitted by the laser diode De, expressed by the following equation;

$$Vcf = Vcc \cdot (R7 + R9)/(R6 + R7 + R9)$$

On the contrary, the potential at the inverting input terminal − (connection B) of the operational amplifier 10 rises according to predetermined characteristics together with the potential of the connection A, which rises with a certain time constant determined by the time constant circuit consisting of the resistance 1 and the capacitor 2 and an initiation judging current Isd flows through the path of power source Vcc → resistance 5 → resistance 3 → from collector to emitter of the transistor 4 → ground line GND with the rising potential at the connection A. This initiation judging current Isd charges the capacitor 2 and increases relatively slowly, corresponding to the base current Ibe4, which is made flow by the fact that th voltage Veb4 applied between the base and the emitter of the transistor 4 arrives at a predetermined value (e.g. + 0.06 V), until it is saturated, depending on the resistance 1 and the current amplification factor $h_{fe}$ of the transistor 4. The potential at the connection B, which rises according to the increasing characteristics of the intensity of this base current Ice4 descends to a potential, obtained by dividing the power source voltage by the resistance 5 set to a relatively high resistance value on one side and the resistance 3 set to a relatively low resistance value and the circuit between the collector and the emitter of the transistor 4 on the other side, which is somewhat lower than the value of the reference voltage Vcf at the connection C. Corresponding thereto, the potential at the connection E rises to a value of the voltage, with which a value of the driving current giving rise to an intensity of light somewhat higher than the central value of the light intensity emitted by the laser diode De by the fact that the ratio in time, with which the "H" level signal is outputted from the output terminal of the operational amplifier 10, increases gradually. Consequently the intensity of the driving current flowing through the laser diode De rises not rapidly at the switch-on of the power source and thus a so-called soft start is effected so that the intensity of the emitted light rises with an appropriate speed, until an intensity of emitted light arrives at a predetermined value.

The intensity of the light emitted by the laser diode De is detected by the photo-diode Dm and in the case where the detected light intensity is higher than the set light intensity, the signal is negatively fedback from the photo-diode Dm so that the potential at the connection B is higher than the value of the reference voltage Vcf applied to the connection C, as explained later. In this way the value of the voltage at the connection E descends so that the intensity of the emitted light is reduced. Similarly, in the case where the intensity of the emitted light is lower than the set intensity, the signal is negatively fedback from the photo-diode Dm so that the potential at the connection B is lower than the value of the reference voltage Vcf applied to the connection C. In this way the value of the voltage at the connection E rises so that the intensity of the emitted light is increased. Consequently the intensity of the light, with which the optical recording medium is irradiated, by the laser diode De is stabilized in a stationary state, depending on the value of the reference voltage Vcf applied to the connection C.

In the photo-diode Dm, to which a bias voltage is applied in the backward direction, the impedance RIDm in the backward direction produced between the cathode and the anode inversely proportionally to the increase in the intensity of the light illuminating the photo-diode Dm decreases. Together with this decrease of the impedance RIDm, the monitor current Im flowing through the path of power source Vcc → from anode to cathode of the photo-diode Dm → resistance 3 → from collector to emitter of the transistor 4 → ground line GND increases. Supposing a case where the value of the base current Ib8 limited by the value of the resistance R1 ($\Omega$) of the resistance 1 and flowing through the transistor 4 from the base to the emitter becomes constant in the state where the voltage measured at the two extremities of the capacitor 2 is saturated, denoting the value of the power source voltage by Vcc (V), the internal resistance of the power source by Rcc ($\Omega$), the impedance in the backward direction between the cathode and the anode of the photo-diode Dm by RIDm ($\Omega$), the resistance value of the resistance 3 by R3 ($\Omega$), the value of the divided voltage given at this time between the collector and the emitter of the transistor 4 by Vce4 (V), and the internal resistance at this time between the collector and the emitter of the transistor 4 by Rce8 ($\Omega$), the value of the monitor current Im (A) has a value of the negative feedback expressed by the following equation;

$$Im = (Vcc - Vce4)/(RIDm + R3 + Rce8)$$

Denoting the resistance value of the resistance 5 by R5 ($\Omega$), the initiation judgment current Isd (A) flowing through the path of power source Vcc → resistance 5 → resistance 3 → from collector to emitter of the transistor 4 → ground line GND, in the state where the value of the base current Ib8 flowing through the transistor 4 between the base and the emitter limited by the value of the resistance R1 ($\Omega$) of the resistance 1 is constant when the voltage between the two terminals of the capacitor 2 is saturated, has a value expressed by the following equation;

$$Isd = (Vcc - Vce4)/(R3 + R5 + Rce8)$$

Consequently a resultant current Isd + Im of the initiation judgment current Isd and the monitor current Im flows through the path of resistance 3 → from collector to emitter of the transistor 4 → ground line GND and controlled by a closed loop so as to approach the value of the reference voltage at the connection C, the potential VB (V) at the connection B in the stationary state has a value expressed by the following equation;

$$VB = (Isd + Im)(R3 + R5 + Rce8) + Vce4$$

Next the protecting operation in the state where an excessive driving current IDe flows through the laser diode De will be explained. The driving current IDe is made flow through the path of power source Vcc → from anode to cathode of the laser diode De → from collector to emitter of the transistor 18 → resistance 19 → ground line GND. The state where the value of the driving current IDe is excessive takes place by the fact that e.g. when the instructing signal input VE from the control section 300 is applied at a high potential by some cause, an excessively high current is made flow through the laser diode De, which tends to destroy it. A current detection signal VR19 produced at this time between the two terminals of the resistance 19 corresponding to the value of the voltage to be compared Vin rises to a level exceeding the base-emitter voltage Vbe20 of the transistor 20 and thus a base current Ibe20 flows through the transistor 20 between the base and the emitter. In this way an excessive current detection value Ice20 depending on the value of the base current Ibe20 flows through the path of power source Vcc → resistance 25 → from collector to emitter of the transistor 20 → ground line GND. At this time the potential at the connection F, through which the excessive current detection value Ice20 flows, becomes lower than the value of the reference voltage Vref applied to the inverting input − of the operational amplifier 11. Consequently the output terminal of the operational amplifier 11 is shifted to the "L" level and kept. Thus the protection instructing signal is applied to the connection E. Since the current intensity instructing signal applied from the control section 300 to the instructing signal input point De passes through the path of resistance 15 → from anode to cathode of the diode 13 → from output terminal of the operational amplifier 11 to negative power supplying terminal not shown in the figure → ground line GND, a state where the potential at the connection E is lowered is realized and further since no base current Ibe18 flows through the transistor 18, the driving current to the laser diode De in the state where the protection instructing signal is applied is interrupted and a protecting operation state where this driving current is cancelled is realized. At the same time as the state enters this protecting operation state, a positive feedback current flows through the path of power source Vcc → from anode to cathode of the diode 12 → from output terminal of the operational amplifier 11 to negative power supplying terminal not shown in the figure → ground line GND. In the holding operation state where the positive feedback current flows through the common connecting point F of the collectors of the transistors 20 and 26, the resistance 25, and the anode of the diode 12, even if the current detection signal VR19 becomes lower than the base - emitter voltage Vbe20 of the transistor 20, the potential applied to the non-inverting input terminal − of the operational amplifier 11 exceeds never the value of the reference voltage Vref. Furthermore, even if a voltage higher than the value of the reference voltage Vref is applied to the base of the transistors 19 and 26, this state is never transmitted to the collectors of the transistors 19 and 26, the holding operation continues to be maintained.

Next the protecting operation in the state where the temperature approaches that of the destruction of the laser diode De will be explained. Even in the state where the driving current having an intensity lower than an excessive current flows through the laser diode De, the probability of the destruction of the laser diode De is high, if the temperature thereof rises. This temperature rise is transferred to the thermistor 22 and the value of the impedance of the thermistor 22 is lowered. The power source voltage Vcc is stabilized by a voltage stabilizing circuit consisting of the resistance 21, the Zener diode 23 and the capacitor 24 and an excessive current obtained by dividing the value of this stabilized voltage by the sum of the value of the impedance of the thermistor 22 and the resistance 26 flows through the thermistor 22. At this time a current intensity detecting signal produced between the two terminals of the resistance 26 corresponding to the value of the voltage to be compared Vin rises to a level higher than the base - emitter voltage Vbe27 of the transistor 27 and the base current Ibe27 flows through the transistor 27 between the base and the emitter. An excessive current detection value depending on the value of the base current Ibe27 flows through the path of resistance 25 → from collector to emitter of the transistor 27 → ground line GND in this state. The potential at the connection F, through which this excessive current detection value Ice20 flows, is lower than the value of the reference voltage Vref applied to the inverting input − of the operational amplifier 11. Consequently the output terminal of the operational amplifier 11 is shifted to the "L" level and held and the protection instructing signal is applied to the connection E. The driving current to the laser diode in the state where the protection instructing signal is applied is cancelled by the fact that the current intensity instructing signal applied from the control section 300 to the instructing signal input point E flows through the path of resistance 15 → from anode to cathode of the diode 13 → from output terminal of the operational amplifier 11 to negative power source supplying terminal not shown in the figure → ground line GND. Since no base current Ibe18 flows through the transistor 18, the transistor 18 is cut off and the protecting operation state is realized. Furthermore, in this state, a holding current flows through the path of power source Vcc → from anode to cathode of the diode 12 → from output terminal of the operational amplifier 11 to negative power source terminal not shown in the figure → ground line GND so that the potential at the connection F is approximately equal to the forward direction voltage value VFD12 allotted to the diode 12 between the anode and the cathode by the voltage division. Consequently, since it exceeds never the value of the reference voltage Vref applied to the inverting input terminal − of the operational amplifier 11, it is held similarly to the protecting operation by the excessive current.

Next the reset operation to return the protecting operation by the excessive current and the excessive heat to the original state will be explained. A pulse signal of "H" level supplied from the reset instructing circuit not shown in the figure, e.g. by a manual operation, etc., is applied to the reset terminal. The collector - emitter circuit of the transistor 8 is made conductive by this pulse signal. Denoting the resistance value of the resistance 6 by R6 (Ω), the resistance value of the resistance 7 by R7 (Ω), and the value of the voltage allotted to the conductive transistor 8 between the collector and the emitter by the voltage division by Vce8 (V), the value of the reset voltage Vs (V) applied to the inverting input terminal of the operational amplifier 11, which voltage is equal to the potential at the connection G, is equal to the voltage value represented by the following equation;

$$Vs = Vcc - (R6 + R7)(Vcc - Vce8)/(R6 + R7)$$

In the operational amplifier 11, to which this value of the reset voltage Vs (V) is once applied, at this time, since the value of the reset voltage Vs (V) becomes lower than the value of the forward voltage VFD12 applied to the non-inverting input terminal +, the output terminal is shifted to the "H" level and the holding state is reset. The potential Vcr (V) at the terminal C as far as the value of the reset voltage Vs (V) is applied to the operational amplifier 11 has a value, which is lower than the value of the reference voltage Vcf indicating the central value of the intensity of the light emitted by the laser diode De, and which is expressed by the following equation;

$$Vcr = Vce8 + (Vcc - Vce8) \cdot R7/(R6 + R7)$$

An instructing signal for starting again the operation is supplied from the control section 300, to which the value of the reference voltage Vcr instructing this low intensity of the emitted light is applied, to the base of the transistor 18. When the reset terminal is returned to the "L" level, an instructing signal instructing the emission of the light in the stationary state is supplied from the control section 300. Consequently, in the new starting state, since an instructing signal to increase stepwise the intensity from the value of the reference voltage Vcr instructing a low intensity of the emitted light to the value of the reference voltage Vcr instructing a intensity of the emitted light in the stationary state, stress given to the laser diode De is small. Further, in the case where an improper state is detected again by the operation detecting section 200, if the driving function of the transistor 18 is normal, the interruption of the driving current IDe is effected in the state where the stress given to the laser diode De is small.

Although in the present embodiment the present invention has been explained by using a construction using bipolar type transistors 19, 26 effecting the amplifying operation, setting the amount allotted to the dividing means having the rectifying function to "0", the present invention is not restricted thereto. Design modifications such as the amplifying operation using operational amplifiers, the comparing operation, the ideal diode operation, etc. may be carried out and further the amount allotted by the voltage division may be modified at need. Still further the positive feedback means can be modified, similarly to the voltage dividing means.

Figure 12:
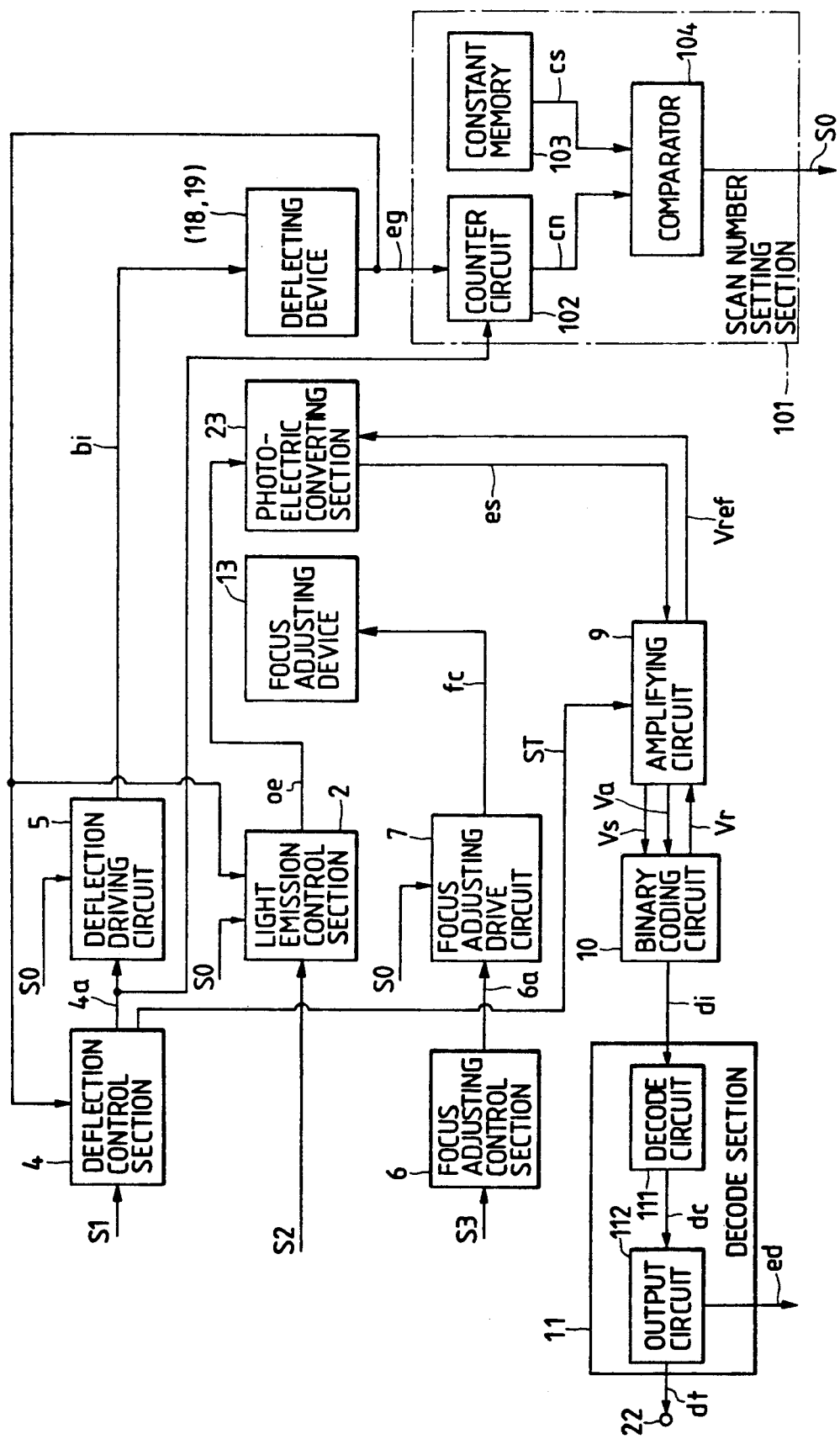
Figure 13:
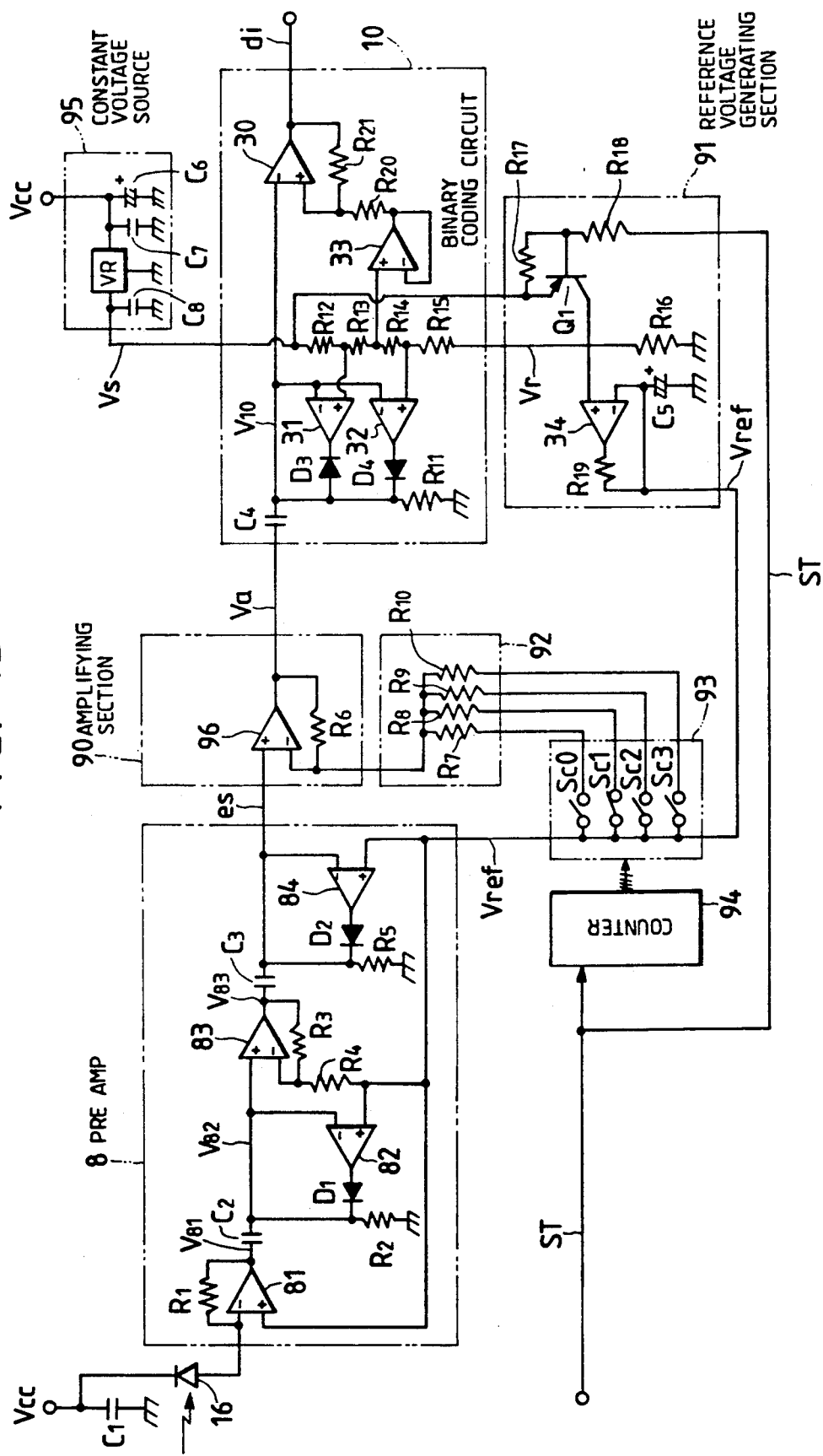
Figure 14:
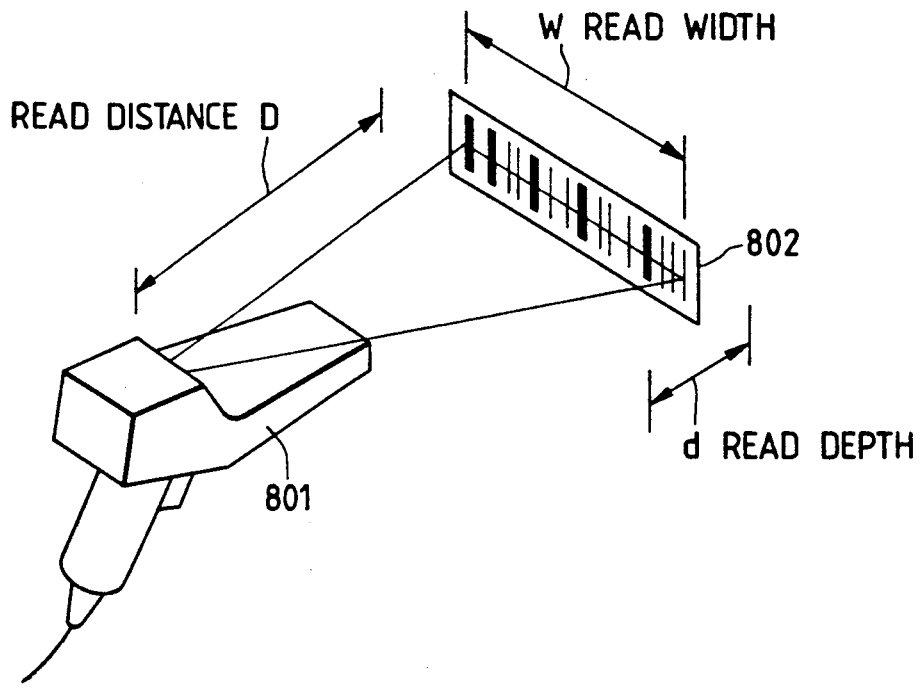
FIG. 14 is a perspective view illustrating a prior art code reading device.
Figure 15:
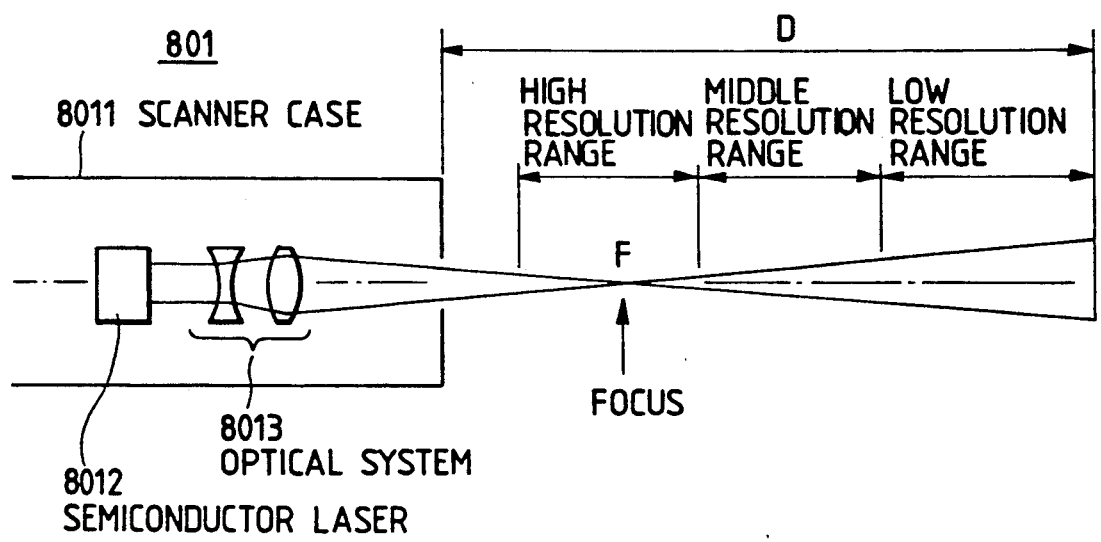
FIG. 15 is a scheme indicating the working mode of the prior art code reading device.
Figure 16A:
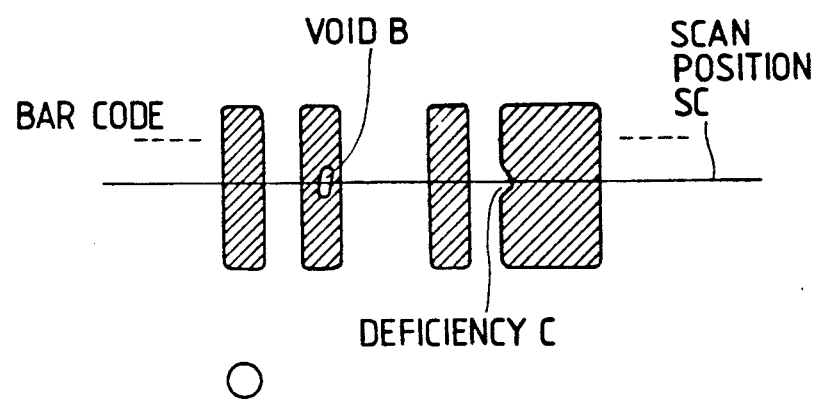
FIG. 16(a) shows the relation between a bar code and the scan position.
Figure 16B:
FIGS. 16(b) to 16(d) indicate waveforms corresponding to the scanning indicated in FIG. 16(a)
Figure 16C:
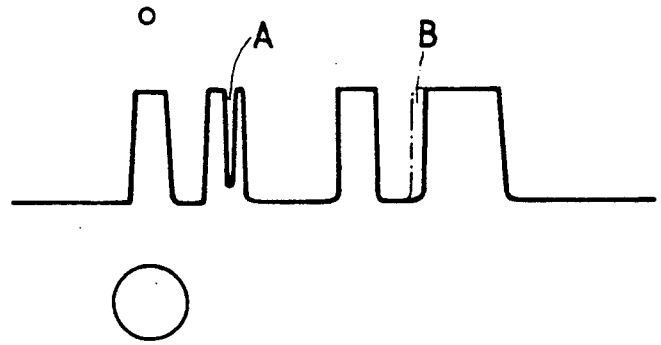
Figure 16D:
Figure 17:
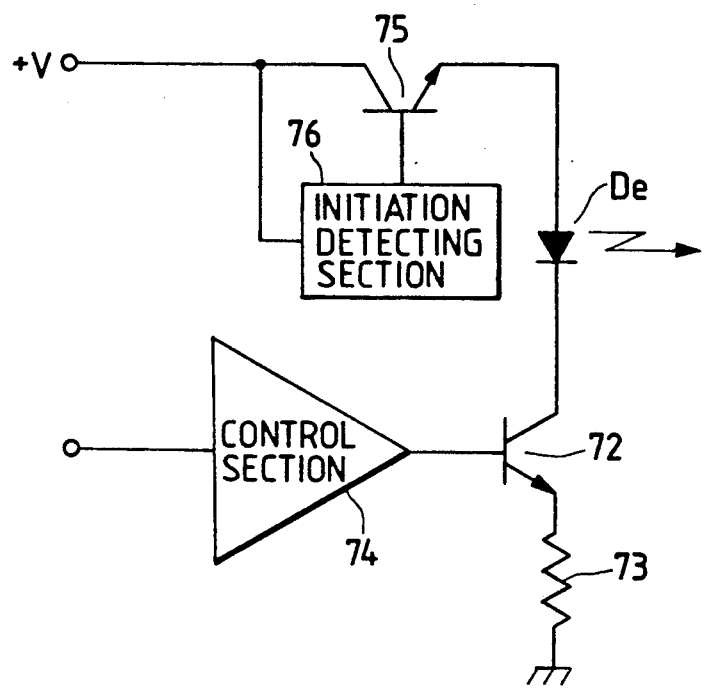
FIG. 17 is a circuit diagram of the prior art code reading device.
Figure 18:
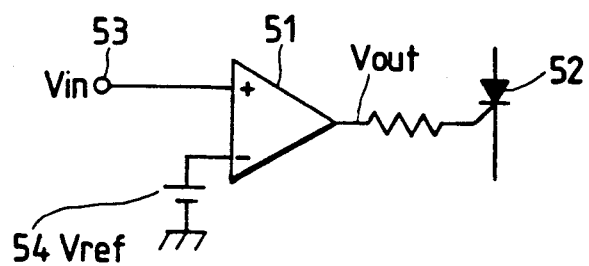
FIG. 18 is a circuit diagram of a comparing circuit used in the prior art code reading device.

Hereinbelow a fourth embodiment of the present invention having the fourth technical means will be explained in detail, referring to FIGS. 11 to 13.

Hereinbelow an embodiment of the present invention will be explained in detail, referring to FIGS. 11 to 13.

Figure 11:
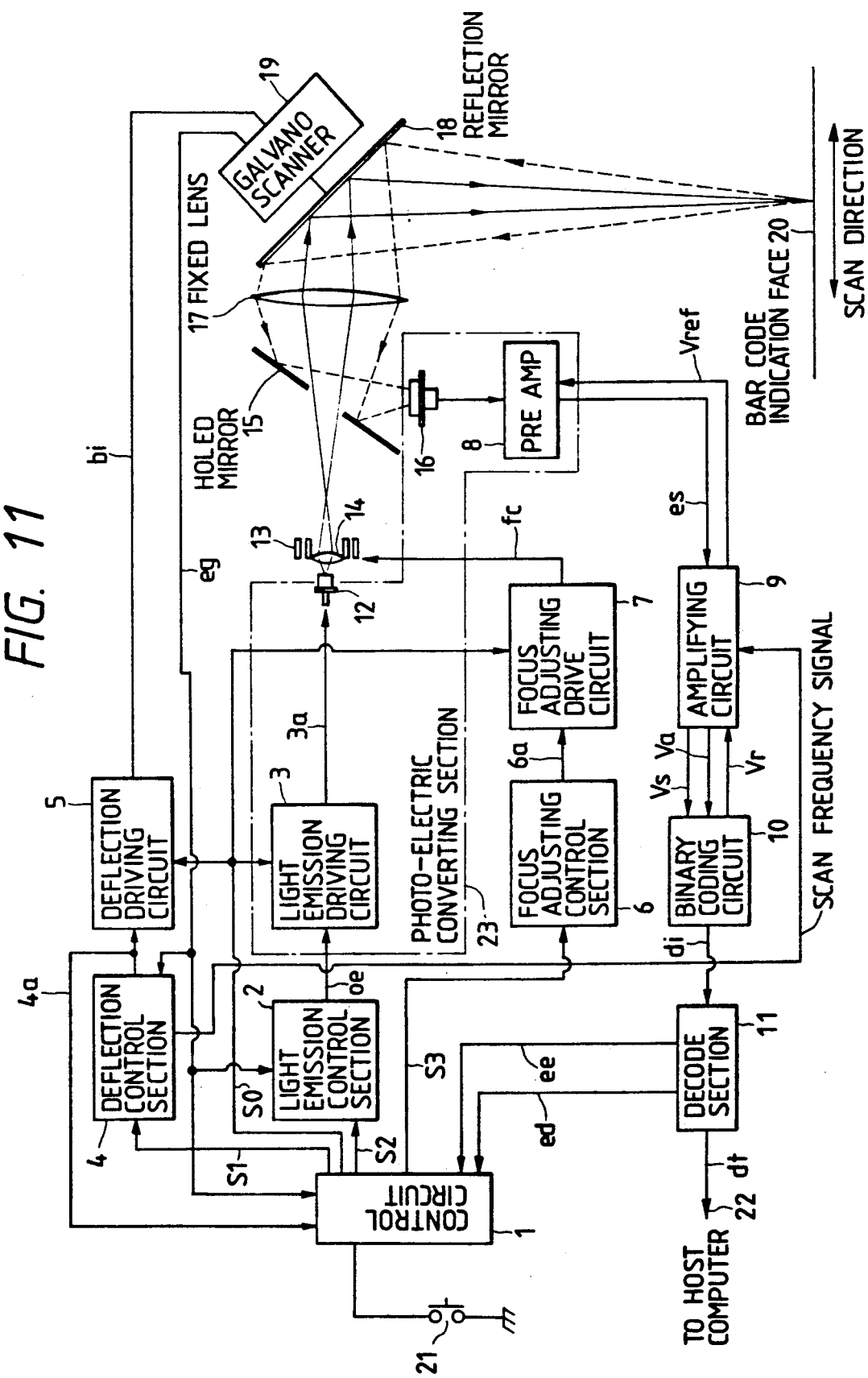
FIGS. 11 to 13 are block diagrams for explaining the code reading device according to the present invention having the fourth technical means of the present invention.

FIG. 11 is a block diagram showing the construction of a whole bar code scanner, which is a code reading device according to the present invention; FIG. 12 is a block diagram showing the construction of the principal part of the control structure of the device indicated in FIG. 11; and FIG. 13 is a circuit diagram indicating the structure for processing the light reception signal.

In the figures, reference numeral 1 is a control circuit; 2 is a light emission control section; 3 is a light emission driving circuit; 4 is a deflection control section; 5 is a deflection driving circuit; 6 is a focus adjusting control section; 7 is a focus adjusting drive circuit; 8 is a preamplifier; 9 is an amplifying circuit; 10 is a binary coding circuit; 11 is a decode section; 12 is a light emitting element; 13 is a focus adjusting device; 14 is a focus adjusting lens; 15 is a holed mirror; 16 is a light receiving element; 17 is a fixed lens; 18 is a reflecting mirror; 19 is a galvano scanner; 20 is a bar code representing surface; 21 is an operation switch; 22 is a photo-electric converting section composed of the light emission driving circuit 3, the light emitting element 12, a light receiving element 16 and a preamplifier 8; 30, 31, 32, 33, 34, 81, 82, 83, 84, 96 are operational amplifiers; 90 is an amplifying section; 91 is a reference voltage generating section; 92 is a feedback quantity setting section; 93 is a selecting section; 94 is a counter; 95 is a constant voltage power source section; 101 is an off signal generating circuit; 102 is a scanning counter; 103 is a constant memory; 104 is a comparing circuit; 111 is a decode circuit; 112 is an output circuit; C1 to C8 are capacitors; D1 to D4 are diodes; VR is a constant voltage power source element, Q1 is a PNP type transistor; R1 to R21 are resistances; Sc0 to Sc3 are switches and Vcc is a positive pole terminal for power supply (hereinbelow called simply "power source").

At first, the construction thereof will be explained. The control circuit 1, in the state where the operation switch 21 is operated in order to carry out the detecting operation, continues to supply a scanning instructing signal s1, a light emission instructing signal s2 and a focus adjustment instructing signal s3 to the deflection control section 4, the light emission control section 2 and the focus adjusting control section 6, respectively, by the fact that the operation switch 21 is once closed. To the control circuit 1 outputting these instructing signals s1, s2 and s3 a stop instructing signal ed from the output circuit 112 in the state where a decode signal dt is obtained in the decode section 11 and a pivot detecting signal eg from the galvano scanner 19 in the deflecting device are supplied. The device is so constructed that when either the stop instructing signal eg is supplied or pivot detecting signals eg are supplied more than a predetermined number of times, these instructing signals s1, s2 and s3 are interrupted.

The pivot detecting signal eg and the scan drive instructing signal 4a, which is the same as the signal, which the control section 4, in which the scan instructing signal s1 is inputted, has supplied to the deflection driving circuit 5, is returned to this scan number setting section 101 in the control circuit 1. In the scanning counter 102 in the scan number setting section 101, the pivot detecting signal eg is supplied to its counting input terminal and the scan drive instructing signal 4a is supplied to its reset terminal. The scan drive instructing signal 4a resets the count number cn of the scanning counter 102 to its initial value at the same time as it instructs the pivot of the galvano scanner 19 to the deflection driving circuit 5. The circuit is so constructed that pivot detecting signals eg outputted in the form of pulses of "H" level for every pivot period of the galvano scanner 19 are counted and the count number cn is supplied to the comparator 104. The circuit is so constructed that in the comparator 104 the count number cn is compared successively with the stored value cs previously set, corresponding to the maximum number of scannings for the scanner 19 and when they are in accordance with each other, the comparator 104 supplies the operation stop instructing signal s0 to the deflection control section 4, the light emission control section 2 and the focus adjusting control section 6 and at the same time interrupts the scanning instructing signal s1, the light emission instructing signal s2 and the focus adjustment instructing signal s3.

The control circuit 1, in the state where the scanning instructing signal s1, the light emission instructing signal s2 and the focus adjustment instructing signal s3 are interrupted, is so constructed that these instructing signals s1, s2 and s3 are again outputted, when the operation switch 21 is again closed.

The deflection control section 4, in the state where the scanning instructing signal s1 is supplied, continues to make the deflection driving circuit 5 output the deflection driving signal bi for making the galvano scanner 19 effect the pivoting operation by means of the scan drive instructing signal 4a and resets the scanning counter 102 in the state where the deflection driving signal bi rises.

Further the circuit is so constructed that the pivot detecting signal eg outputted by the galvano scanner 19 is supplied to the deflection control section 4 and that under the condition that the scan instructing signal s1 is supplied, a scanning period signal ST is supplied to the amplifying circuit 9 in synchronism with the rise of the pivot detecting signal eg to the "H" level. This scanning period signal ST falls to the "L" level, just before the sweep linear speed, with which the deflecting devices 18 and 19 sweep the spot of the laser beam, goes out of the tolerated region therefor, to stop the amplifying and processing operation. When a predetermined period of time has lapsed, supposing that the linear sweep speed has been within the tolerated region, scanning period signal ST rises to the "H" level and is outputted to execute the amplifying and processing operation.

The circuit is so constructed that the deflection driving circuit 5, in the state where the deflection driving signal bi is outputted, while the scan drive instructing signal 4a is supplied, interrupts the scan drive instructing signal 4a for interrupting the pivoting operation of the galvano scanner 19, when the operation stop instructing signal s0 is once supplied.

When the deflection driving signal bi begins to be supplied, the galvano scanner 19 begins to move towards one end of the pivot region from the position not specified, where it has been stopped. The galvano scanner 19 is so constructed that when it arrives at this end, it is returned so that it pivots forward and backward with a constant period and speed determined, depending on the mass, the resistance against the pivot, etc. of the mass consisting principally of the pivoting portion of the galvano scanner 19 and the pivoting reflecting mirror 18 mounted on this galvano scanner 19. A position detecting function is incorporated in this galvano scanner 19 to detect the pivot detecting signal eg rising to the "H" level at the position corresponding to the tolerated region of the linear sweep speed, with which the reflecting mirror 18 makes the spot of the laser beam sweep, for every scanning period to output it.

The pivot detecting signal eg is supplied also to the light emission control section 2, in the state where the light emission instructing signal s2 is supplied. In this way an accident preventing construction is realized, in which the light emission control section 2 supplies the light emission drive instructing signal oe to the light emission driving circuit 3 in synchronism with the second rise of the pivot detecting signal eg to the "H" level so that irradiation is not effected with a linear scanning speed of the laser spot at the start, which is lower than a predetermined value. For this accident preventing construction at the start it is sufficient that the number of pivot detecting signals eg is greater than 1. It is so constructed that it contributes also to the stabilization of the reading speed and that the detecting operation time is not too long because of an excessively great number thereof. The accident preventing construction is realized by the fact that in the case where the repetition period of this pivot detecting signal eg is longer than a period previously set, the light emission control section 2 intercepts the light emission drive instructing signal oe so that irradiation is not effected with a linear scanning speed of the laser spot during the detection, which is lower than a predetermined value.

The light emission driving circuit 3 is constructed so as to supply the light emission driving current to the light emission element 12 composed of a semiconductor laser diode for exciting it to emit a laser light beam during the period of time where the pivot detecting signal eg is supplied.

The light emitting element 12 is constructed so as to irradiate the reflecting mirror 18 with the laser light beam having an intensity corresponding to the intensity of the light emission driving current 3a through the path consisting of the focus adjusting lens 14, the hole formed in the holed mirror 15 and the fixed lens 17 in this order, during the period of time the light emission driving current 3a flows therethrough. In this construction the laser beam projected to the reflecting mirror 18 forms a beam spot on the bar code representing surface 20 and is swept by the reflecting mirror 18 mounted so as to be pivoted with the galvano scanner 19.

The focus adjusting control section 6 is constructed so as to supply the focus drive instructing signal 6a to the focus adjusting drive circuit 7 for moving the focus adjusting lens 14 with a speed in a direction previously determined for the greatest number of pivots, which the galvano scanner effects, for every operation of the operation switch 21, during the period of time where the focus adjustment instructing signal s3 is supplied.

The focus adjusting drive circuit 7, to which the focus drive instructing signal 6a is supplied, is constructed so as to supply the focus adjusting drive signal fc indicating the position, to which the focus adjusting lens 14 is to be moved, corresponding to the value of the focus drive instructing signal 6a, to the focus adjusting device 13 having the voice coil, only during the period of time no operation interruption instructing signal s0 is supplied. The focus adjusting device 13, to which the focus adjusting drive signal fc is supplied, is constructed so as to move the focus adjusting lens 14 mounted on the actuator portion linked with the voice coil, through which current is made flow by the focus adjusting drive signal fc.

The focusing position of the beam spot moved by the focus adjusting lens 14 is constructed so as to be varied, corresponding to the pivot speed of the galvano scanner 19, depending on the intensity of the current flowing through the voice coil, and to be regulated mechanically.

The device is so constructed that the laser light beam, whose focus is variable, is collected by the fixed lens 17 with collecting characteristics determined by the region of the diameter of the hole formed in the holed mirror.

On the other hand, the device is so constructed that the laser light beam, with which the bar code representing surface 20 is irradiated, is collected and projected on the light sensitive surface of the light receiving element 16 composed of a PIN type photo-diode in the form of a reflected light beam corresponding to the reflection coefficient of the bar code representation through the path consisting of the pivoting reflecting mirror 18, the fixed lens 17 and the deflecting surface of the holed mirror 15.

The device is so constructed that the light reception signal having a small amplitude corresponding to the intensity of the light thus collected, projected and reflected is supplied to the preamplifier 8, where it is compared with the reference voltage Vref supplied by the amplifying circuit 9 and amplified. The circuit is so constructed that the analogue signal es preamplified by the preamplifier 8, where it is compared with the reference voltage Vref and amplified, is supplied to the amplifying circuit 9 updating the amplification factor and the reference voltage Vref for the amplification operation according to the scanning period signal ST outputted by the deflection control section 4, corresponding to the pivoting operation of the galvano scanner 19.

The circuit is so constructed that this amplifying circuit 9 supplies the value of the constant voltage Vs for setting the threshold value for the binary coding circuit 10; the divided voltage value Vr corresponding to the set threshold value is supplied; and this divided voltage value Vr generates a value of the reference voltage Vref, which is updated for every inputted scanning period signal ST, this reference voltage Vref serving as the reference for the amplifying operation by means of the preamplifier 8 and the amplifying circuit 9. This updating of the value of the reference voltage Vref is started by the fact that a pulse shaped scanning period signal ST is supplied from the deflection control section 4 to the amplifying circuit 9, which signal is shifted to the "H" level on the basis of a pulse shaped pivot detection signal eg outputted by the galvano scanner 19, just before the linear sweep speed of the beam spot projected on the bar code representing surface 20 exceeds the tolerated variation value. Thus the circuit is so constructed that the amplifying circuit 9 continues to supply a high divided voltage value Vr to the binary coding circuit 10 for stopping the binary coding operation and a high value of the reference voltage Vref to the preamplifier 8 and the amplifying circuit 9 for stopping the amplifying operation. The device is so constructed that the pulse shaped scanning period signal ST, which is shifted from the "H" level to the "L" level for obtaining the value of the stationary divided voltage Vr for effecting the binary coding operation, is supplied from the deflection control section 4 to the amplifying circuit 9, in the state where the reflecting mirror 18 returns from this state to the pivoting center position. The amplifying circuit 9, to which the scanning period signal ST, which has been shifted to the "H" level, has been supplied, supplies immediately the stationary divided voltage value Vr to the binary coding circuit 10 and at the same time the value of the reference voltage Vref for the reference for the amplifying operation simulating the divided voltage value Vr at this time to the preamplifier 8 and the amplifying circuit 9, before the linear scanning speed of the beam spot, with which the bar code representing surface 20 is irradiated, becomes a value within the tolerated variation region. The circuit is so constructed that the value of the reference voltage Vref updated in this way continues to be held during a certain period of time where the linear scanning speed of the beam spot, with which the bar code representing surface 20 is irradiated, is within the tolerated variation region and further that the value of the reference voltage Vref remains unchanged during a period of time until the scanning period signal ST shifted to the "H" level by the fact that the galvano scanner 19 is pivoted is supplied.

The device is so constructed that the amplifying circuit 9, to which the scanning period signal ST shifted to the "H" level for every scanning period of the galvano scanner 19 is supplied, has a constant amplification factor, while the linear scanning speed of the beam spot is within the tolerated variation region and that the variation direction and the variation width of the amplification factor are previously set for every time when the scanning period signal ST is supplied.

The device is so constructed that the binary coding circuit 10, to which the amplified signal Va from the amplifying circuit 9 with the constant amplification factor by the amplifying operation based on the updated value of the reference voltage Vref, processes the amplitude waveform of the amplified signal Va during a period of time where the stationary divided voltage value Vr to supply the binary signal di transformed into a rectangular wave of "H" and "L" level to the decode section 11. On the other hand the device is so constructed that during a period of time where a high value of the divided voltage Vr is supplied, the amplified signal Va in all the supplied states is cancelled and the binary coding circuit 10 supplies a unchanged binary coded signal di to the decode section 11.

The device is so constructed that the decode section 11, to which the binary coded signal di corresponding to the information represented by the bar code is supplied, transforms it into a bit image; further transforms each of the bit image data into character data; supplies the interruption instructing signal ed for interrupting the detection scanning, when it is judged that a set of start and stop code exists; and at the same time supplies the character data to a host computer not indicated in the figure in the form of the decoded signal. On the other hand the device is so constructed that in the state where no decoded signal dt can be outputted from the point of time where the binary coded signal di is supplied for the first time to the point of time previously set, corresponding to the pivoting speed of the galvano scanner 19, the decode section 11 cancels the supplied binary coded signal di, supposing that it contains no necessary information and thus no coded signal dt is outputted to the host computer.

Next the construction of an embodiment of the signal processing from the light emitting element 16 to the binary coding circuit 10 will be explained, referring to FIG. 13.

The cathode of the light emitting element 16 is connected with the power source Vcc, whose negative pole is grounded through the common ground line and the connection of this cathode with the power source Vcc is grounded through the noise bypassing capacitor C1 for removing undesirable noise having short periods. The anode of the light receiving element 16 is connected with the inverting input terminal − of the operational amplifier 81, which is the input terminal of the preamplifier 8. The resistance R1 for the current feedback is connected between this inverting input terminal − and the output terminal of the operational amplifier 81. The value of the reference voltage Vref having two states outputted by the reference voltage generating section 91 is applied to the non-inverting terminal + of the operational amplifier 81. A same value as this value of the reference voltage Vref serves as the operation reference potential. The circuit is constructed as a current − voltage transforming circuit generating an output voltage, in which variations in the impedance between the cathode and the anode of the light receiving element 16 are superposed on this operation reference potential. The value of the output voltage V81 of this current − voltage transforming circuit is so constructed that according to increase and decrease in the intensity of the received light, the impedance from the cathode to the anode of the light receiving element 16 is lowered and raised and the intensity of the input current, which is made flow through the path of power source Vcc → cathode and anode of of the light receiving element 16 → inverting input terminal − of the operational amplifier 81 → resistance R1 → inverting input terminal − of the operational amplifier 81→negative pole power source terminal not shown in the figure of the operational amplifier 81 → ground in this direction, increases and decreases, respectively, so that a value of the product of variations in this current $\Delta I$ and the current feedback resistance R1 is superposed on a same value as the value of the reference voltage Vref according to the relationship given by;

$$V81 = Vref + \Delta I \cdot R1$$

The value of the output voltage Vo from the output terminal of this operational amplifier 81 is grounded through the capacitor C2 and the resistance R2. All of the cathode of the diode D1, the inverting input terminal − of the operational amplifier 82 and the non-inverting input terminal + of the operational amplifier 83 are connected with the common connection point between the capacitor C2 and the resistance R2. The anode of the diode D1 and the output terminal of the operational amplifier 82 are connected with each other and thus the ideal diode circuit, in which the value of the reference voltage Vref is applied to the non-inverting input terminal + of the operational amplifier 82, forms a clamp circuit working together with the capacitor C2 by using the value of the reference voltage Vref as the working potential. A processing voltage value V82 obtained by the fact that the value of the output voltage V81 of the current—voltage transforming circuit is clamped along the value of the reference voltage Vref on the "L" level side, when black bars, for which the intensity of the reflected light is weak, on the bar code representing surface 20 are read out by this clamp circuit, is applied to the non-inverting input terminal + of the operational amplifier 82. The resistance R3 for the negative feedback is connected between the inverting input terminal − of this operational amplifier 82 and the output terminal and the value of the reference voltage Vref is applied to this inverting input terminal − through the resistance R4. The value of the amplified voltage V83 of this operational amplifier 82 is outputted with the same polarity according to the ratio of the voltage division determined by the resistance R3 and the resistance R4 by dividing the value of the processing voltage V82, for which the "L" level side is clamped along the value of the reference voltage Vref, using the value of the voltage reference Vref as the working potential, as expressed by;

$$V83 = V82 \cdot (R3/R4 + 1)$$

This value of the amplified voltage V83 is grounded through a series circuit consisting of the capacitor C3 and the resistance R5 and the ideal diode circuit is connected with the common connecting point between the capacitor C3 and the resistance R5, which circuit consists of the diode D2 and the operational amplifier 84 and works just as the diode D1 and the operational amplifier 82. The capacitor C3 and this ideal diode circuit are connected so that they work just as the set of the capacitor C3 and the ideal diode circuit clamping the value of the output voltage V8. Thus the value of the voltage obtained by processing the value of the voltage V83 by means of this clamp circuit is supplied to the amplifying circuit 9 as the analogue signal es, whose voltage increases with the increasing intensity of the reflected light obtained by the fact that it is preamplified by the preamplifier 8 and the "L" level side thereof is clamp-processed along the value of the reference voltage Vref.

The operational amplifier 96 is disposed in the amplifying section 90 of the amplifying circuit 9, in which amplifier the analogue signal es is applied to the non-inverting input terminal +. The resistance R6 for the negative feedback is connected between the output terminal and the inverting input terminal − of this operational amplifier 96.

One end of the resistances R8 to R10 disposed in the feedback quantity setting section 92 is connected with the inverting input terminal − of the operational amplifier 96, to which this resistance R6 is connected.

The other end of each of the resistances R8 to R10 disposed in the feedback quantity setting section 92 is connected with one end of each of the switches Sc0 to Sc3 disposed in the selecting section 93. The value of the reference voltage Vref outputted by the reference voltage generating section 91 disposed in the amplifying circuit 9 is applied to the other end of these switches Sc0 to Sc3.

This reference voltage generating section 91 is so constructed that two kinds of values of the reference voltage Vref are outputted, referring to the constant voltage value Vs outputted by the constant voltage power source section 95 disposed in the amplifying circuit 9 according to the scanning period signal ST supplied from the deflection control section 4, which is shifted to the "L" and the "H" level for every scanning period of the galvano scanner, and the divided voltage value Vr, which sets the binary coding operation of the binary coding circuit 10 on the basis of this constant voltage value Vs by means of the resistances R12 to R15.

The scanning period signal ST from the deflection control section 4 is applied to the base of the transistor Q1 disposed in the reference voltage generating section 91 through the resistance R18. The resistance R17 for setting the input impedance is connected between the base and the emitter of this transistor Q1. The constant voltage value Vs outputted always at a constant voltage by the reference voltage generating section 91 is applied always to the emitter of this transistor Q1. One end of the resistance R16 disposed in the reference voltage generating section 91, the non-inverting input terminal + of the operational amplifier 34 and one end of the resistance R15 in the binary coding circuit 10 are all connected with the cathode of the transistor Q1 and the other end of the resistance R16 is grounded. The inverting input terminal − of this operational amplifier 4 is grounded through the capacitor C5 set at a relatively large electrostatic capacitance and the output terminal of the operational amplifier 34 is so connected that the negative feedback is effected therefrom through the resistance R19. The common connecting point of the resistance R19, the capacitor C5 and the inverting input terminal − of the operational amplifier 34 serves as the output terminal for outputting the value of the reference voltage Vref of the reference voltage generating section 91.

The circuit is so constructed that the common connecting point of one end of the resistance R16 disposed in the reference voltage generating section 91 and the non-inverting input terminal + of the operational amplifier 34 serves as the input terminal for referring to the binary coded reference voltage of the binary coding circuit 10 so that the constant voltage value Vs outputted by the constant voltage power source section 95 disposed in the amplifying circuit 9 is applied thereto through a series circuit consisting of the resistances R12 to R15 disposed in the binary coding circuit 10.

In the transistor Q1 during the period of time where the deflection control section 4 applies the scanning period signal ST of "L" level to the base thereof, since the base current Ib is made flow through the transistor from the emitter to the base, the collector current Ic is made flow through the transistor Q1 from the emitter to the collector and this collector Ic flows through the resistor R16 to the ground line. During the period of time where the collector current Ic is made flow through the transistor Q1, representing the emitter—collector voltage allotted between the emitter and the collector of the transistor Q1 by the voltage division by Vce, a divided voltage value Vr(R), which is a high value close to the constant voltage value Vs, as expressed by the following equation, which is determined approximately by the product of the collector current value Ic and the value of the resistance R16, is applied to the non-inverting input terminal + of the operational amplifier 34, because the value of the series resistance circuit consisting of the resistances R12 to R15 is 1.5 to 4 times as great as that of the resistance R16 and the voltage Vce as well as the impedance Rce between the emitter and the collector are relatively low;

$$Vr(R) = R16 \cdot \{Vce/Rce + [Vce/(R12 + R13 + R14 + R15)]\}$$
$$= R16 \cdot \{Ic + [Vce/(R12 + R13 + R14 + R15)]\}$$

The operational amplifier 34, in which the high voltage value Vr(R) allotted by the voltage division is applied to the non-inverting input terminal +, makes the negative feedback current flow through the resistance R19 from the output terminal thereof, until the voltage between the two terminals of the capacitor C5 connected with the inverting input terminal − arrives at the divided voltage value Vr(R). The time measured from the point of time where this negative feedback current begins to flow to the point of time where the voltage arrives at the value of the reference voltage Vref(R), which is equal to the divided voltage value Vr(R), is set to a relatively short charging time determined by the time constant of the resistance R19 and the capacitor C5. The circuit is so constructed that this reference voltage value Vref(R) is maintained only during the period of time where the voltage applied to the non-inverting input terminal + of the operational amplifier 34 is equal to the divided voltage value Vr(R).

In the transistor Q1 during the period of time where the deflection control section 4 applies the scanning period signal ST of "H" level to the base thereof, the base current Ib flowing through the transistor Q1 from the emitter to the base is interrupted and the collector current Ic, which was made flow through the transistor Q1 from the emitter to the collector. In the state where the collector current Ic is interrupted, a divided voltage value Vr(F), which is a relatively low value close to the ground line side, as expressed by the following equation, obtained by dividing the constant voltage value Vs by the resistance ratio of the resistance R16 to the series resistance circuit consisting of the resistances R12 to R15, which is 1.5 to 4 times as great as that of the resistance R16, is applied to the non-inverting input terminal + of the operational amplifier 34 in the state where the collector current Ic is interrupted, because the emitter—collector voltage Vce allotted by the voltage division to the transistor Q1 between the emitter and the collector is extremely close to the constant voltage value Vs;

$$Vr(F) = R16 \cdot [Vs/(R12 + R13 + R14 + R15 + R16)]$$

The operational amplifier 34, in which the low voltage value Vr(F) is applied to the non-inverting input terminal +, makes the negative feedback current flow through the resistance R19 from the capacitor C5, until the voltage between the two terminals of the capacitor C5 connected with the inverting input terminal − arrives at the divided voltage value Vr(F). The time measured from the point of time where this negative feedback current begins to flow to the point of time where the voltage arrives at the value of the reference voltage Vref(F), which is equal to the divided voltage value Vr(F), is set to a relatively short charging time determined by the time constant of the resistance R19 and the capacitor C5. The circuit is so constructed that this reference voltage value Vref(F) is maintained only the period of time where the voltage applied to the non-inverting input terminal + of the operational amplifier 34 is equal to the divided voltage value Vr(F).

The circuit is so constructed that the switches Sc0 to Sc3 effect the closing operation according to the closing instruction from the counter 94 disposed in the amplifying circuit 9 and vary the value of the impedance between the non-inverting input terminal − of the operational amplifier 96 and the point, to which the reference voltage Vref is applied among 16 values at maximum.

The circuit is so constructed that the scanning period signal ST outputted by the deflection control section 4, which is shifted to the "H" level for every scanning period of the galvano scanner 19 is supplied to the counter 94, which issues the closing instruction to the switches Sc0 to Sc3, so that the amplification factor is constant only during the period of time where the linear scanning speed of the beam spot is in the tolerated variation region and that the amplification factor is renewed and it is operated with a constant amplification factor, when the linear scanning speed of the beam spot has become once out of the tolerated variation region and returns to a value within the tolerated variation region. This counter 94 is constructed so as to update the count number step by step by shifting the level from "L" to "H" for every scanning period of the galvano scanner 19 and to issue the opening and closing instruction to each of the switches by the output state to four closing instruction lines representing this updated count number.

The circuit is so constructed that during the period of time where the linear scanning speed of the beam spot is within the tolerated variation region, the amplified signal Va outputted by the amplifying section 90 according to the opening and closing operation of the switches Sc0 to Sc3 is outputted in the same polarity according to the following equation, using an amplification factor set by the resistance R6 and the resultant resistance Rz of the resistances R8 to R10 according to the opening and closing operation of the switches Sc0 to Sc3 and the reference voltage value Vref as the working voltage;

$$Va = es \cdot (R6/Rz + 1)$$

The circuit is so constructed that the constant voltage power source disposed in the amplifying circuit 9 is grounded through the capacitor C6 for bypassing relatively slow variations in the voltage of the power source Vcc and the capacitor for bypassing relatively fast variations in the voltage in order to effect the smoothing operation. This power source voltage value Vcc thus processed by bypassing voltage variations is applied to the input terminal of the constant voltage power source element VR of semiconductor three terminal type. The ground terminal of this constant voltage power source element VR is connected with the ground line so that the constant voltage value Vs outputted from this output terminal is grounded through the noise bypassing capacitor C8 for removing the pulse-like noise component. The circuit is so constructed that the constant voltage value Vs processed by bypassing voltage variations by means of this capacitor C8 is lower than the power source voltage value Vcc by a predetermined value and that the constant voltage value Vs stabilized within the nominal current consumption of the constant voltage power source element VR is supplied to one end of the resistor R12 in the binary coding circuit 10 as well as to the connection between the emitter of the transistor Q1 and the resistance R17 disposed in the reference voltage generating circuit 91.

The amplified signal Va supplied to the binary coding circuit 10 is grounded through a series circuit consisting of the capacitor C4 and the resistance R11. The inverting input terminals − of the operational amplifiers 30, 31 and 32 as well as the anode and the cathode of the diodes D3 and D4, respectively, are connected with the connection between this capacitor C4 and the resistance R11. The non-inverting input terminal + of the operational amplifier 31 is connected with the common connecting point between the resistance R12 and the resistance R13 among the resistances R12 to R16 connected in series between the constant voltage value Vs and the ground line. This output terminal is connected with the cathode of the diode D3 so that the diode D3 and the operational amplifier 31 constitute an ideal diode circuit and thus an upper clamp circuit is constituted by this ideal diode circuit and the capacitor C4, which upper clamp circuit clamps the high voltage value side of the supplied amplified signal Va with the upper clamp voltage value indicated by the following equation;

$$V10h = (R13 + R14 + R15 + R16) \cdot Vs / (R12 + R13 + R14 + R15 + R16)$$

The non-inverting input terminal + of the amplifier 32 is connected with the common connecting point between the resistance R14 and the resistance R15 among the resistances R12 to R16 connected in series between the constant voltage value Vs and the ground line and the output terminal thereof is connected with the anode of the diode D4 so that the diode D4 and the operational amplifier 32 constitute an ideal diode circuit. This ideal diode circuit and the capacitor C4 constitute a lower limit clamp circuit, which clamps the low voltage side of the supplied amplified signal Va expressed by the following equation;

$$V10l = (R15+R16) \cdot Vs/(R12+R13+R14+R15+R16)$$

The resistances R12 to R15 as well as the resistance 16, which are connected in series, are set to high impedance values so that their resistance is not varied by heat produced by the current flowing therethrough. Further the state of these resistances R12 to R15 connected in series is monitored by monitoring the divided voltage value Vr(F), which is the voltage value appearing between the two terminals of the resistance R16, and the signal thus obtained is supplied to the preamplifier 8 and the selecting section 93 in the amplifying circuit 9 as the reference voltage Vref(F) only during the period of time where the scanning period signal ST of "H" level is supplied. In this way the amplified signal Va, which is signal-processed along this reference voltage value Vref(F), is supplied.

The non-inverting input terminal + of the operational amplifier 33 is connected with the common connecting point between the resistance R13 and the resistance R13 among the resistances R12 to R15 and the resistance 16 connected in series and the output terminal and the inverting input terminal − thereof are directly connected with each other so that the central voltage value V10m between the upper clamped voltage value V10h and the lower clamped voltage value V10l is buffer-amplified and that they are outputted with a same value. This central voltage value V10m thus buffer-amplified is applied to the non-inverting input terminal + of the operational amplifier 30 through the resistance R20. The resistance R21 for the positive feedback is inserted between the output terminal and the non-inverting input terminal + of this operational amplifier 30 so that the binary coding operation is executed around the central voltage value V10m. When the clamped voltage V10, whose upper and lower extremities are clamp-processed and which is applied to the non-inverting input terminal −, has once exceeded the voltage value applied to the non-inverting input terminal + of the operational amplifier 30, this operational amplifier 30 outputs a signal of "L" level through the output terminal thereof and at the same time lowers further the voltage value applied to the non-inverting input terminal + towards the ground potential side. On the contrary, when the clamped voltage V10, whose upper and lower extremities are clamp-processed and which is applied to the non-inverting input terminal −, has once become lower than the voltage value applied to the non-inverting input terminal + of the operational amplifier 30, this operational amplifier 30 outputs a signal of "H" level through the output terminal thereof and at the same time raises further the voltage value applied to the non-inverting input terminal + towards the power source voltage value Vcc side. The output terminal of the operational amplifier 30, which is updated for every inversion of such two stable threshold values is constructed as the output terminal of the binary coding circuit supplying the binary decoded signal di to the decode circuit 111.

On the other hand, in the binary coding circuit 10, to which the high divided voltage value Vr(R) is applied, since the voltage difference between the upper clamped voltage value V10h and the lower clamped voltage value V10l is small by the fact that relatively low voltage Vce between the emitter and the collector in the state where the collector current Ic is made flow through the transistor Q1 is applied between the two terminals of the resistances R12 to R15 connected in series and the central voltage value V10m is shifted significantly towards the power source voltage Vcc side because of the fact that the divided voltage value Vr(R) is not high, the supplied amplified signal Va is not binary coded. In this way the circuit is so constructed that a binary coded signal di in the state where it is always at the "H" level and not shifted is outputted so that it is prevented that the processing time necessary for the succeeding decoding operation is elongated or the processing becomes impossible.

Although in the embodiments explained above the means for selecting and setting the amplification factor is constructed so as to vary the amplification factor for every pivot of the galvano scanner 19, the present invention is not limited thereto, but it may be so constructed that the amplification factor is varied once for a plurality of pivots of the galvano scanner 19.

Further, if this means for selecting and setting the amplification factor keeps the amplification factor constant during a period of time where reading out is effected with a linear speed of the pivot of the galvano scanner 19 is within the tolerated region, it is not limited to means varying it stepwise, but it may be constructed so as to vary it continuously.

As explained above, according to the present invention having the first technical means, since the focusing position adjusting mechanism is controlled by the fact that the bar code is correctly decoded, it is possible to provide a laser scanner having excellent functions that the bar code is read out at a focusing position, where reading out can be effected, corresponding to the printing quality of the bar code and the surface state of the recording medium and that the reading probability is significantly improved.

As explained above, according to the present invention having the second technical means, since the device is so constructed that the normal driving current is controlled by the driving element 18 controlling the driving current and at the same time and that it includes initiation detecting means 100 and control means 300 capable of making this element 18 carry out a soft start operation at the starting so that no useless voltage divided in series in the laser diode De, the applied power source voltage can be utilized with a high efficiency and therefore a stable operation can be obtained even by setting the power source voltage at a low value.

As explained above, according to the present invention having the third technical means, since the comparing circuit executes a stable holding operation by utilizing the result obtained by comparing the input voltage to be compared with the reference voltage through the diode inserted at least in one of the positive feedback circuit and the input circuit, an effect can be obtained that a comparing circuit with a holding function is provided, which can be formed in one-chip-analogue-IC and mounted on a small mounting board and which is suitable for small portable apparatuses, etc.

As explained above, according to the present invention having the fourth technical means, since the device is so constructed that the amplification factor is fixed during one period for scanning and detecting the code and that the amplification factor is varied for different scanning periods, the signal processing can be effected with the optimum amplification factor and the code can be read out in a wide recording state. Furthermore, in a code reading device such as a hand held device, for which the power source voltage is restricted, an effect can be obtained that desired processed signals are obtained by utilizing the width of the power souce with a high efficiency for the amplifying and the binary coding operation, etc.

The embodiments of the invention in which an exclusive property or privilege is claimed are defined as follows:

1. A code reading device having circuit for protecting a laser diode comprising:
   a laser diode for outputting a laser beam and connected to a power source;
   driving means connected in series therewith for controlling current flowing through said laser diode;
   control means for supplying a signal for controlling said driving means; and
   means for detecting a voltage of said power source and outputting a signal to said control means preventing surge of current through the laser diode during a predetermined time after switching on of said power source, said means for detecting including a capacitor connected to said power source and charged by said voltage of said power source and a transistor having its control terminal connected to said capacitor and a second terminal connected to said power source, wherein said signal to said control means increases as a current at said second terminal increases in response to the charge on said capacitor.

2. A code reading device including a circuit for detecting light levels comprising:
   a comparator having a reference input terminal to which a reference voltage is applied, having a comparison input terminal to which a voltage to be compared is applied, and having an output terminal for outputting a comparison output voltage;
   positive feedback means for supplying positive feedback current from the output terminal to the comparison input terminal;
   voltage-dividing means for dividing the voltage to be compared and to which said positive feedback means is connected; and
   means connected to the reference input terminal for preventing feedback current from flowing through the positive feedback means and resetting the comparator when the value of the voltage supplied through said voltage dividing means equals the reference voltage, said means for preventing including a reset switch connecting said reference terminal to said reference voltage when said voltage is being compared, and connecting said reference terminal to a reset voltage differing from said reference voltage when said feedback is to be prevented;
   wherein both the positive feedback means and the voltage dividing means include a diode for regulating the direction of current therethrough.

3. A code reader comprising:
   a scanner for scanning with light a medium on which a code is recorded;
   a photodetector for detecting a level of light reflected by the medium;
   a preamplifier for comparing the level of light detected by the photodetector to a reference value and providing an output signal in response thereto;
   an amplifier for amplifying the output signal of the preamplifier and for providing the reference value, the amplifier having a reference terminal;
   a decoder for converting the amplified output signal to a digital value;
   a deflection control for causing the scanner to scan the code and for providing an amplification factor by which the amplifier amplifies the output signal of the preamplifier, wherein the deflection control includes means for keeping the amplification factor constant during each scan of the code, and changing the amplification factor prior to a subsequent scan of the code when the decoder indicates the code has not been read by the previous scan;
   a plurality of resistors each switchably connected to the reference terminal of the amplifier; and
   a counter for switching the resistors and actuated by a signal indicating the duration of the scanning;
   wherein operation of the counter by the signal indicating scanning also determines the amplification factor.

* * * * *